United States Patent
Yogo

(10) Patent No.: US 12,088,970 B2
(45) Date of Patent: Sep. 10, 2024

(54) LIGHT SOURCE DEVICE AND PROJECTION DISPLAY APPARATUS

(71) Applicant: Panasonic Intellectual Property Management Co., Ltd., Osaka (JP)

(72) Inventor: Takanori Yogo, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 475 days.

(21) Appl. No.: 17/355,536

(22) Filed: Jun. 23, 2021

(65) Prior Publication Data

US 2021/0321066 A1  Oct. 14, 2021

Related U.S. Application Data

(63) Continuation of application No. PCT/JP2019/049642, filed on Dec. 18, 2019.

(30) Foreign Application Priority Data

Dec. 25, 2018 (JP) ................................ 2018-240533

(51) Int. Cl.
| | |
|---|---|
| H04N 9/31 | (2006.01) |
| G02B 27/28 | (2006.01) |
| G03B 21/20 | (2006.01) |
| G03B 33/12 | (2006.01) |

(52) U.S. Cl.
CPC ......... *H04N 9/3164* (2013.01); *G02B 27/283* (2013.01); *G03B 21/2013* (2013.01);
(Continued)

(58) Field of Classification Search
CPC .. H04N 9/3164; H04N 9/3138; H04N 9/3161; H04N 9/3158; G02B 27/283;
(Continued)

(56) References Cited

U.S. PATENT DOCUMENTS

| | | |
|---|---|---|
| 2004/0252744 A1 | 12/2004 | Anikitchev et al. |
| 2012/0008098 A1 | 1/2012 | Akiyama |

(Continued)

FOREIGN PATENT DOCUMENTS

| | | |
|---|---|---|
| JP | 2005-292283 | 10/2005 |
| JP | 2008-76783 | 4/2008 |

(Continued)

OTHER PUBLICATIONS

International Search Report issued Mar. 17, 2020 in corresponding International Application No. PCT/JP2019/049642.

*Primary Examiner* — Magda Cruz
(74) *Attorney, Agent, or Firm* — Wenderoth, Lind & Ponack, L.L.P.

(57) ABSTRACT

A light source device includes: a first light emitting device including a plurality of first solid-state light emitting elements arranged at a regular interval in a two dimensional array form; a second light emitting device including a plurality of second solid-state light emitting elements arranged at a regular interval in a two dimensional array form; and a first light combining plate including a first region and a second region, the first region transmitting first light beams emitted from the plurality of first solid-state light emitting elements of the first light emitting device, the second region reflecting second light beams emitted from the plurality of second solid-state light emitting elements of the second light emitting device. Beam arrangement of (i) the first light beams transmitted through the first light combining plate and (ii) the second light beams reflected by the first light combining plate form a closest packed array.

15 Claims, 14 Drawing Sheets

(52) U.S. Cl.
CPC ........... *G03B 33/12* (2013.01); *H04N 9/3138* (2013.01); *H04N 9/3161* (2013.01)

(58) Field of Classification Search
CPC .............. G02B 26/008; G02B 27/1033; G02B 27/141; G02B 27/149; G03B 21/2013; G03B 33/12; G03B 21/2073; G03B 21/208; G03B 21/204; G03B 21/2066; F21S 2/00; F21V 7/00
See application file for complete search history.

(56) References Cited

U.S. PATENT DOCUMENTS

| | | | | |
|---|---|---|---|---|
| 2012/0133903 | A1* | 5/2012 | Tanaka | ............... G03B 21/2066 353/31 |
| 2014/0354956 | A1* | 12/2014 | Yamada | ............... H04N 9/3164 353/20 |
| 2015/0270682 | A1 | 9/2015 | Daniels et al. | |
| 2016/0341395 | A1 | 11/2016 | Kiyota et al. | |
| 2018/0217486 | A1* | 8/2018 | Tanaka | ................... G03B 21/28 |
| 2019/0203908 | A1 | 7/2019 | Kiyota et al. | |

FOREIGN PATENT DOCUMENTS

| | | |
|---|---|---|
| JP | 2008-298951 | 12/2008 |
| JP | 2010-102049 | 5/2010 |
| JP | 2012-18208 | 1/2012 |
| JP | 2012-79622 | 4/2012 |
| JP | 5527058 | 6/2014 |
| JP | 2014-154214 | 8/2014 |
| JP | 2017-72788 | 4/2017 |
| JP | 2017-211603 | 11/2017 |
| JP | 6288132 | 3/2018 |
| WO | 2013/105546 | 7/2013 |

* cited by examiner

FIG. 2
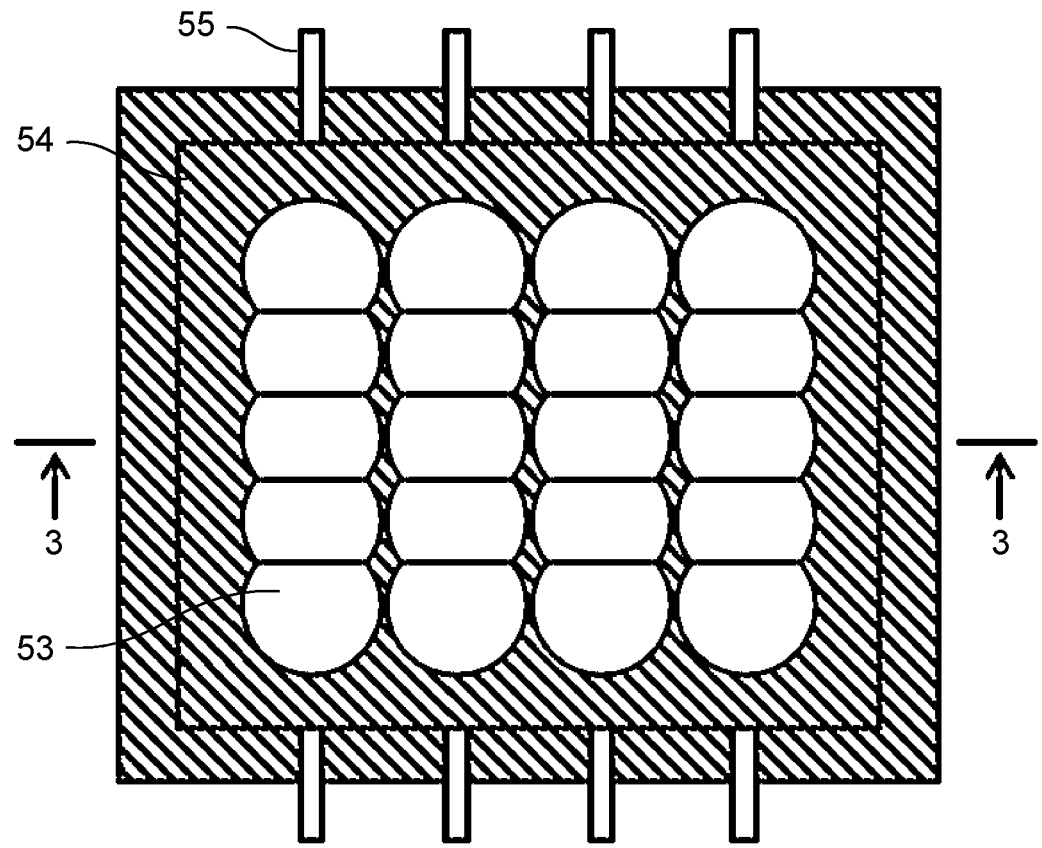
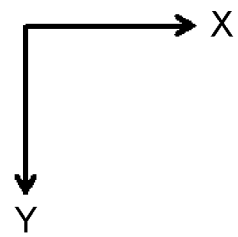
FIG. 3
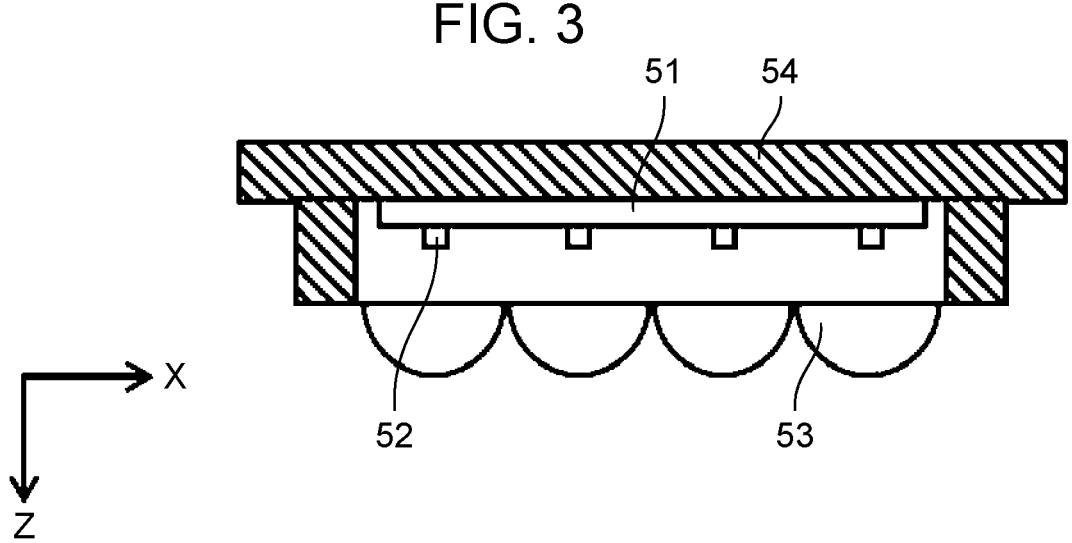

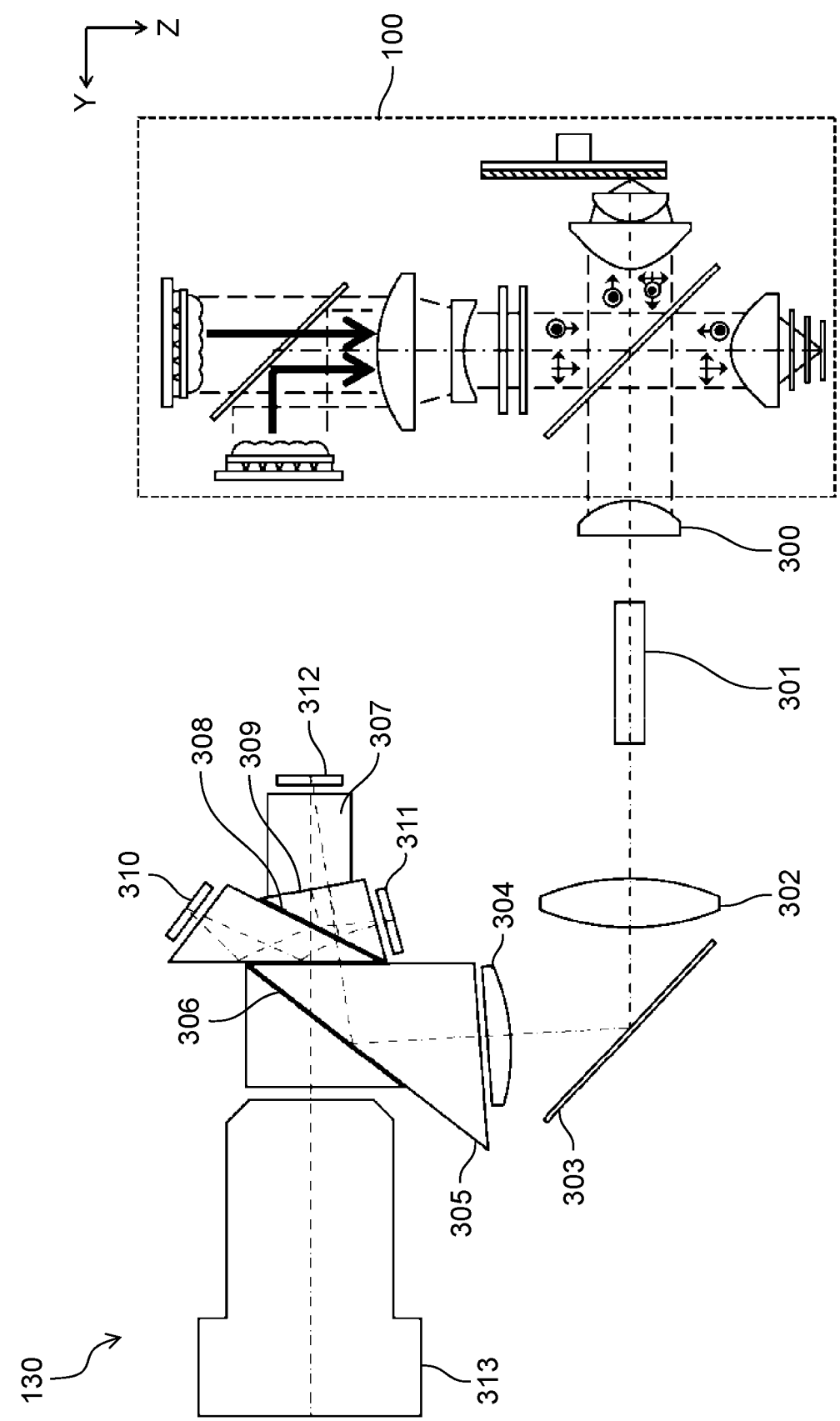

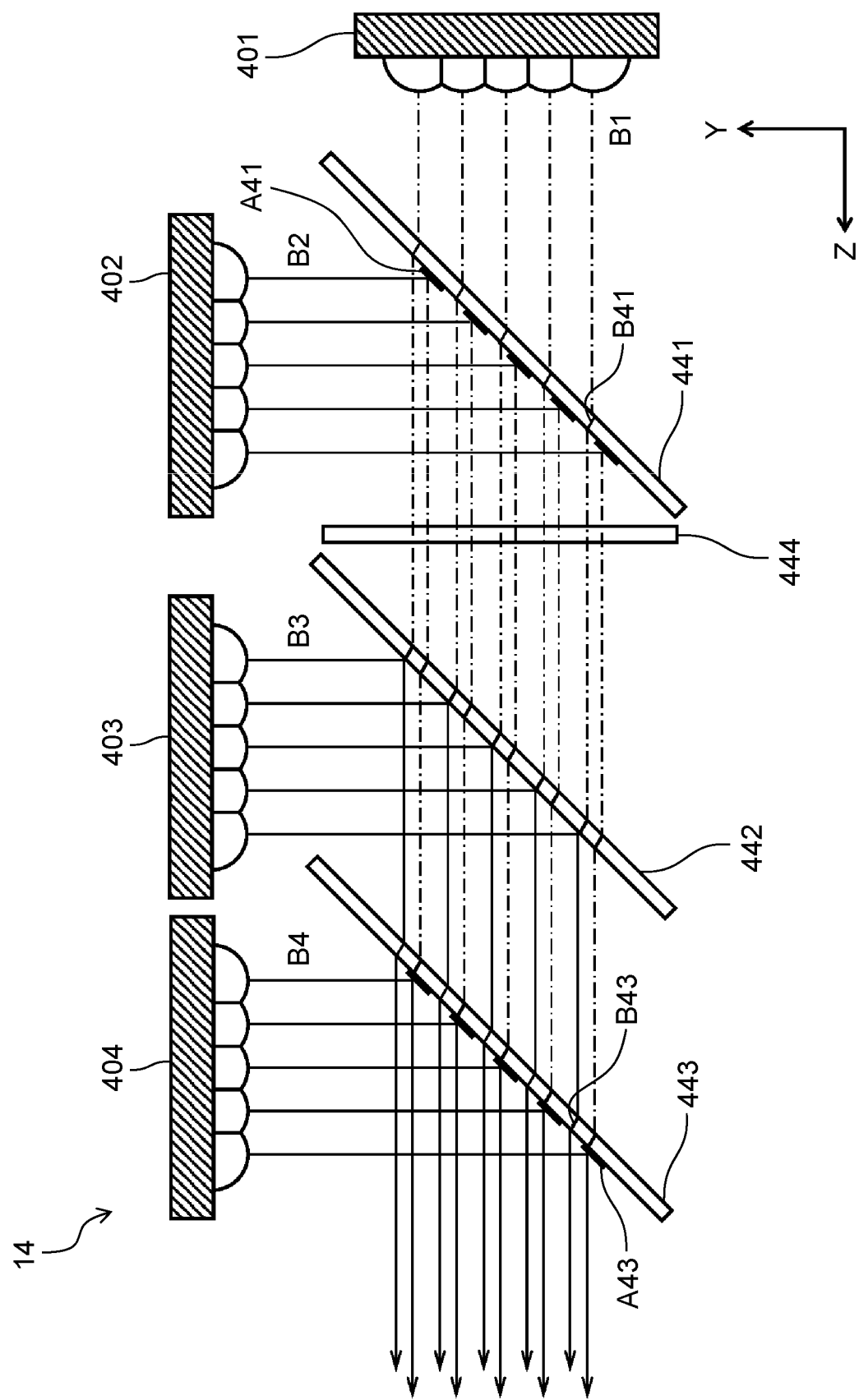

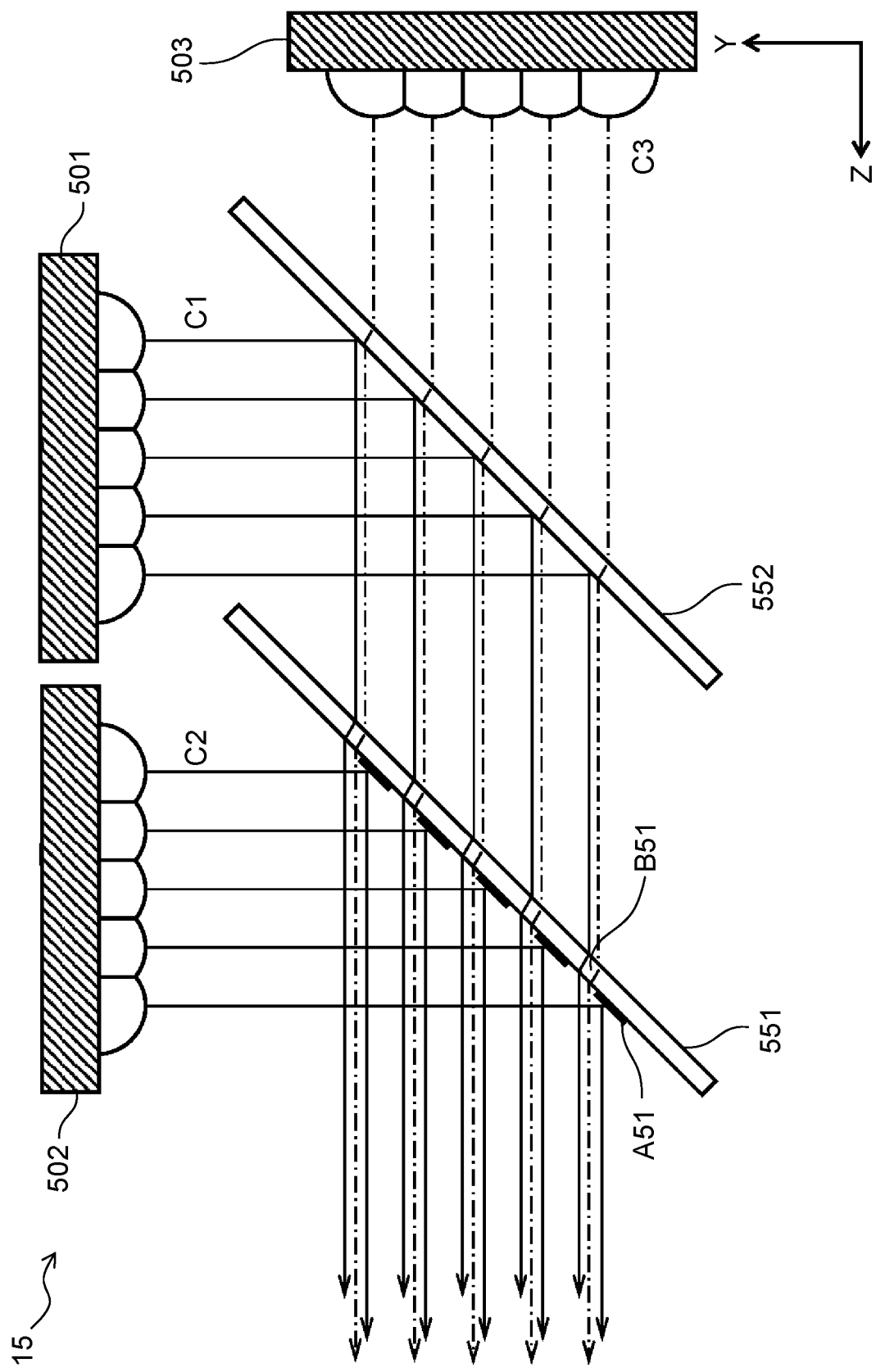

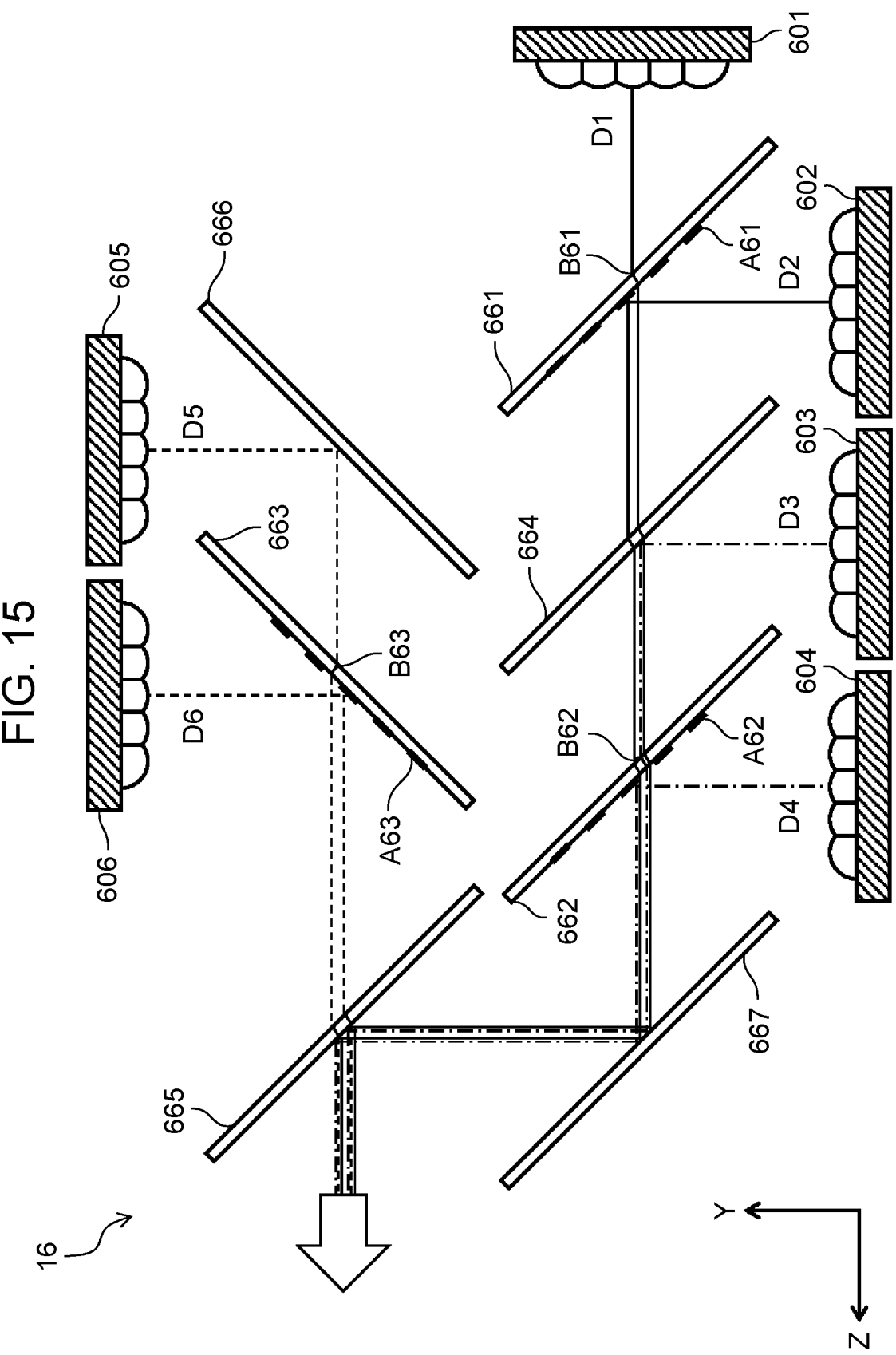

LIGHT SOURCE DEVICE AND PROJECTION DISPLAY APPARATUS

BACKGROUND

1. Technical Field

The present disclosure relates to, for example, a light source device used as a light source of a projection display apparatus, and a projection display apparatus provided with such a light source device.

2. Description of the Related Art

Conventionally, various light source devices including long-life solid-state light emitting elements such as light emitting diodes and semiconductor laser elements have been disclosed as a light source of a projection display apparatus including a light modulation element such as a digital micromirror device (DMD) and a liquid crystal panel.

Patent Literature (PTL) 1 discloses a light emitting device including a substrate, a plurality of semiconductor laser elements, and a lens array including a plurality of lenses that are integrated for the sake of downsizing.

PTL 2 discloses a small light source device that obtains a luminous flux by combining light beams from a plurality of solid-state light sources by using a mirror in which band-shaped transmission regions and reflection regions are alternately arranged.

PTL 1 is Japanese Patent No. 6288132.
PTL 2 is Unexamined Japanese Patent Publication No. 2017-211603.

SUMMARY

The light emitting device as disclosed in PTL 1 has a plurality of solid-state light emitting elements densely arranged, and thus can be obtained as a small-sized and high-output single light emitting device. A plurality of small light emitting devices arranged to form a high-brightness light source device result in a short distance between light beams from the respective light emitting devices. In such a case, when a conventional mirror in which band-shaped transmission regions or reflection regions are arranged is used, light beams cause vignetting on the reflection regions, leading to compromised efficiency. Thus, the light beams from the plurality of light emitting devices are required to be highly efficiently combined without wasteful use of a space.

The present disclosure provides a light source device including a plurality of light emitting devices each including a substrate, a plurality of solid-state light emitting elements, and a plurality lenses that are integrated with each other, the light source device enabling light beams from the plurality of light emitting devices to be efficiently combined without wasteful use of a space.

A light source device of the present disclosure includes: a first light emitting device including a plurality of first solid-state light emitting elements arranged at a regular interval in a two dimensional array form; a second light emitting device including a plurality of second solid-state light emitting elements arranged at a regular interval in a two dimensional array form; and a first light combining plate including: a first region and a second region, the first region transmitting first light beams emitted from the plurality of first solid-state light emitting elements of the first light emitting device, the second region reflecting second light beams emitted from the plurality of second solid-state light emitting elements of the second light emitting device. Beam arrangement of (i) the first light beams transmitted through the first light combining plate and (ii) the second light beams reflected by the first light combining plate form a closest packed array.

The light source device of the present disclosure is effective for combining light beams from a plurality of light emitting devices efficiently without wasteful use of a space.

BRIEF DESCRIPTION OF DRAWINGS

FIG. 2 is a plan view illustrating a configuration of light emitting device 1 illustrated in FIG. 1.

FIG. 3 is a cross-sectional view taken along line 3-3 in FIG. 2.

FIG. 12 is a schematic view illustrating a configuration of a projection display apparatus according to a third exemplary embodiment.

FIG. 13 is a schematic view illustrating a configuration of a light source device according to a fourth exemplary embodiment.

FIG. 14 is a schematic view illustrating a configuration of a light source device according to a fifth exemplary embodiment.

FIG. 15 is a schematic view illustrating a configuration of a light source device according to a sixth exemplary embodiment.

DETAILED DESCRIPTION

Hereinafter, exemplary embodiments will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art.

Note that the inventor provides the attached drawings and the following description to help those skilled in the art fully understand the present disclosure, and does not intend to limit the subject matter as described in the appended claims to these.

First Exemplary Embodiment

1-1. Overall Configuration

Figure 1:
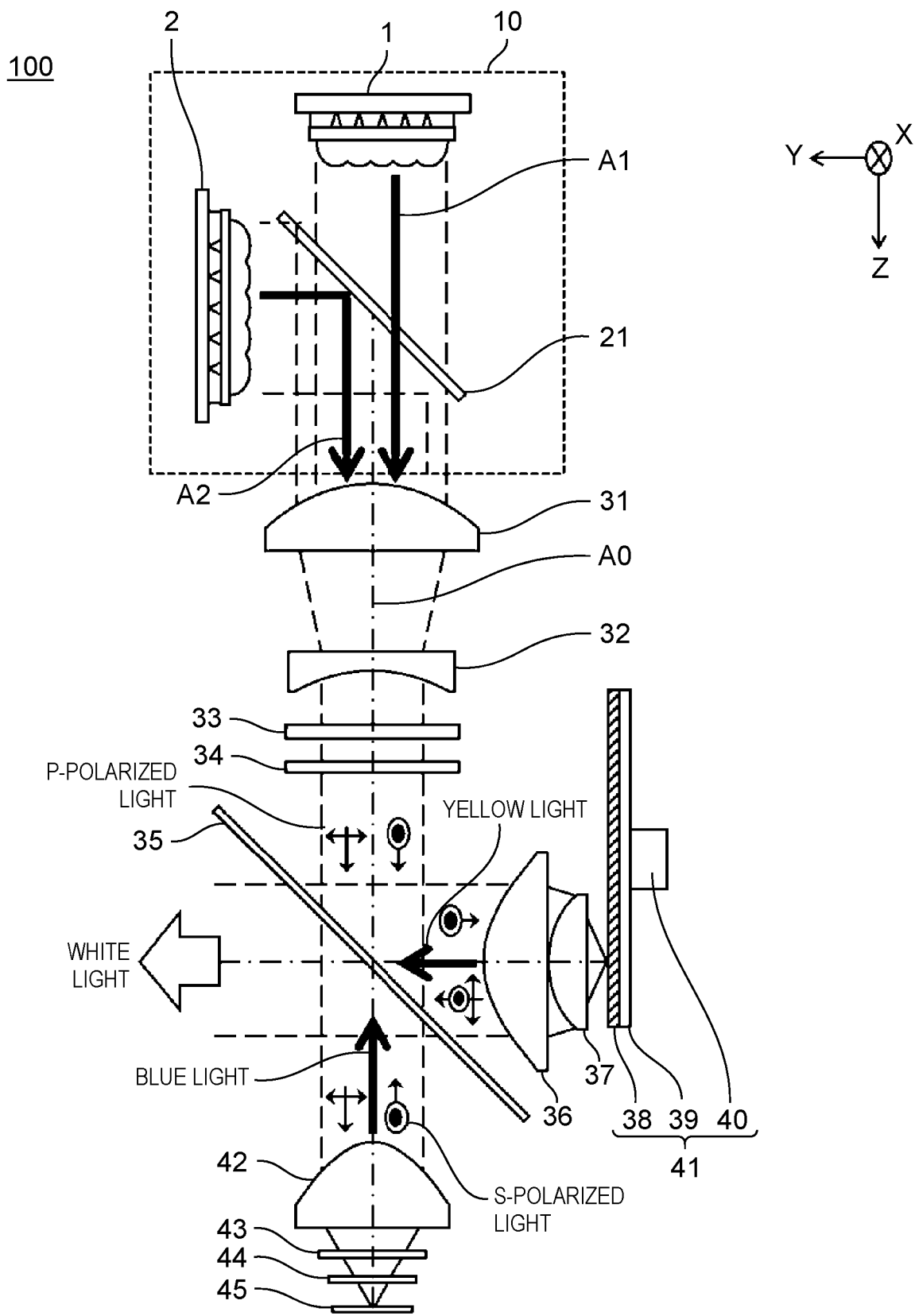
FIG. 1 is a schematic view illustrating a configuration of a white light source device according to a first exemplary embodiment.

FIG. 1 is a schematic view illustrating a configuration of white light source device 100 according to a first exemplary embodiment. White light source device 100 includes light source device 10, lenses 31, 32, diffuser 33, waveplate 34, dichroic mirror 35, condenser lenses 36, 37, phosphor wheel device 41, condenser lens 42, diffuser 43, waveplate 44, and reflector 45. A description below is given using an XYZ cartesian coordinate system illustrated in FIG. 1 as appropriate. A Z axis direction is a direction of a light beam emitted from light source device 10.

1-2. Configuration of Light Emitting Device Group

Light source device 10 includes two light emitting devices, that is, light emitting device 1 (an example of a first light emitting device) and light emitting device 2 (an example of a second light emitting device).

FIG. 2 is a plan view illustrating a configuration of light emitting device 1 illustrated in FIG. 1. FIG. 3 is a cross-sectional view taken along line 3-3 in FIG. 2. Light emitting device 1 includes substrate 51, a plurality of solid-state light emitting elements 52, a plurality of lenses 53, housing 54, and electrodes 55. Light emitting device 2 also has the same structure as that illustrated in FIGS. 2 and 3.

On substrate 51, the plurality of solid-state light emitting elements 52 are arranged closed to each other at a regular interval to be in a two dimensional array form. In the present exemplary embodiment, 20 (4×5) solid-state light emitting elements 52 are arranged at the intersections of grid lines orthogonal to each other. Substrate 51 is an example of a base.

Each of solid-state light emitting elements 52 is, for example, a semiconductor laser element that generates blue light having a wavelength of 447 nm to 462 nm.

Each of lenses 53 is arranged so as to be located above the corresponding one of solid-state light emitting elements 52. Each of lenses 53 is a collimating lens that converts the light generated by the corresponding one of solid-state light emitting elements 52 into parallel light.

Housing 54 surrounds substrate 51 and the array of solid-state light emitting elements 52.

Electrodes 55 are connected to solid-state light emitting elements 52 inside housing 54, and solid-state light emitting elements 52 are driven via electrodes 55.

In the example illustrated in FIG. 1, light emitting device 1 generates light linearly polarized along a YZ plane.

When a plurality of light emitting devices are arranged to form a high-brightness light source device, an increase in the size of a luminous flux as a combination of the light beams from the light emitting devices results in an increase in the size of mirrors and lenses on the optical path. As a result, the size of the white light source device increases, and the size of a projection display apparatus using the same also increases. In view of this, light source device 10 of the present exemplary embodiment is configured to efficiently combine the light beams from a plurality of light emitting devices without wasteful use of a space.

Figure 4:
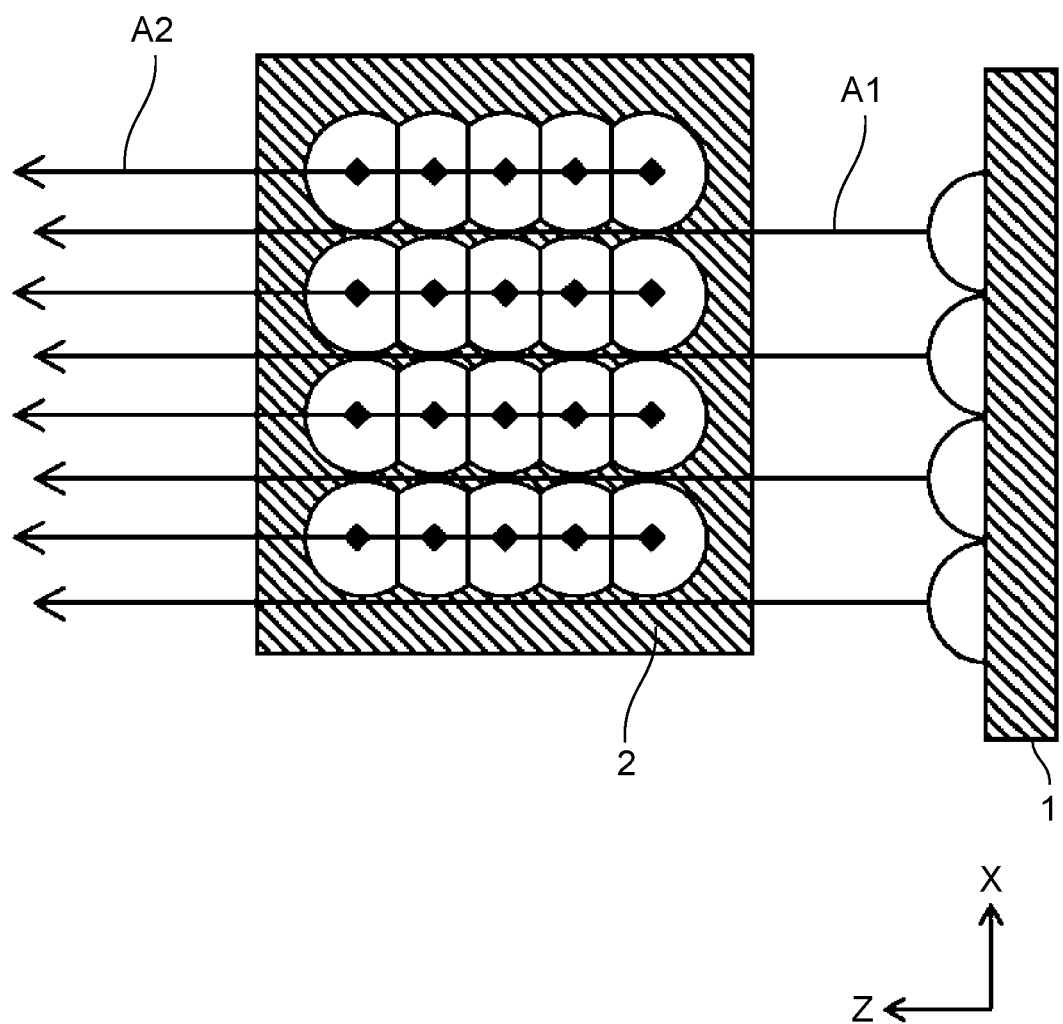
FIG. 4 is a diagram illustrating an arrangement of light emitting devices 1, 2 illustrated in FIG. 1.

FIG. 4 is a diagram illustrating an arrangement of light emitting devices 1, 2, with light source device 10 of FIG. 1 viewed in a Y axis direction. FIG. 4 illustrates the following situation. Specifically, light beam A2 from light emitting device 2 is reflected by light combining plate 21 (an example of a first light combining plate), light beam A1 from light emitting device 1 passes through light combining plate 21, and light beams A1, A2 form a single luminous flux traveling in the Z axis direction, while being shifted from each other by a half pitch in an X axis direction.

Figure 5:
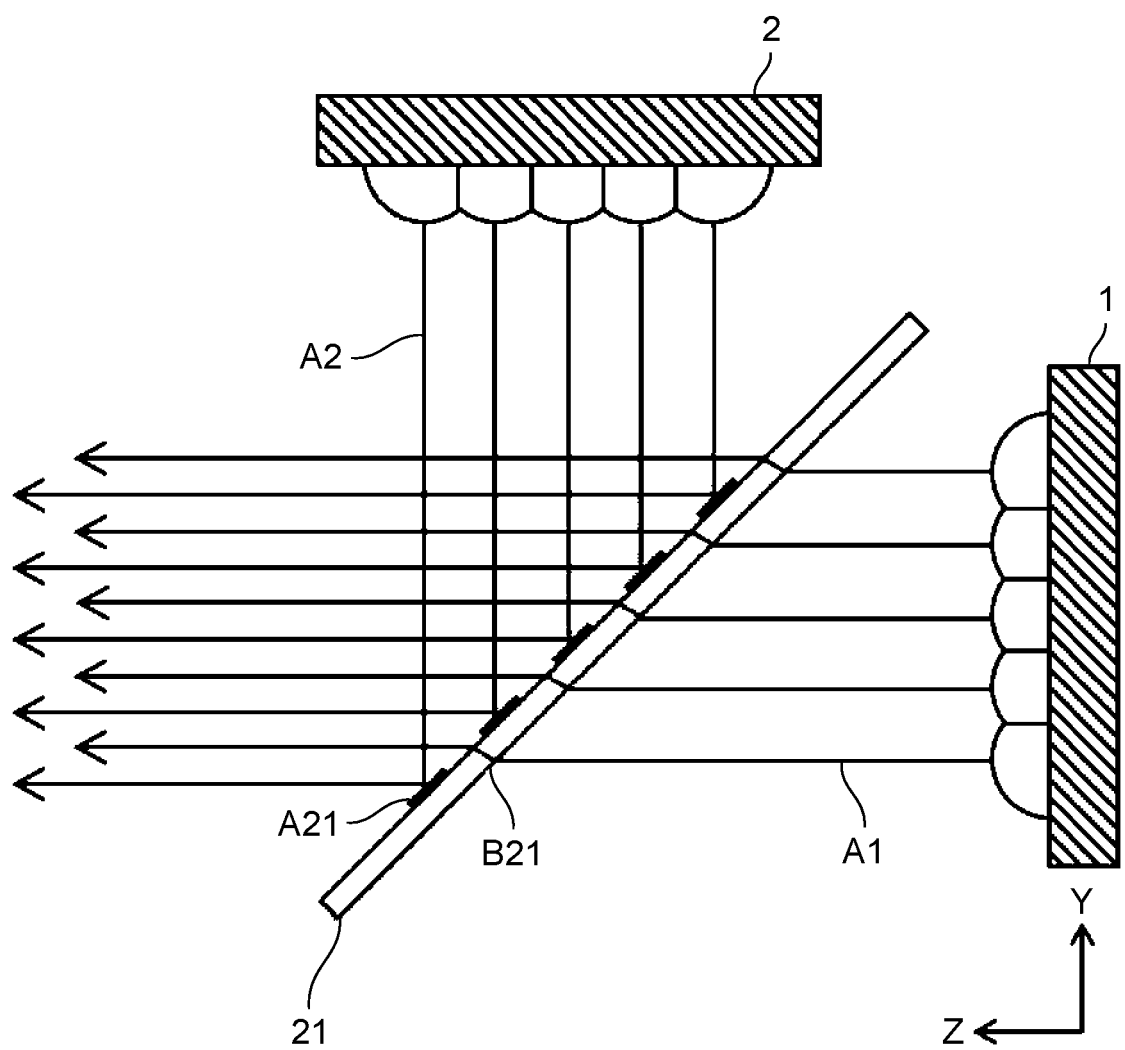
FIG. 5 is a diagram illustrating an arrangement of light emitting device 1, light emitting device 2, and a light combining plate illustrated in FIG. 1.

FIG. 5 is a diagram illustrating the arrangement of light emitting devices 1, 2 and light combining plate 21, with light source device 10 of FIG. 1 viewed in the X axis direction. Light beam A1 from light emitting device 1 passes through transmission region B21 of light combining plate 21, light beam A2 from light emitting device 2 is reflected by reflection region A21 of light combining plate 21, and light beams A1, A2 that pass through light combining plate 21 form a single luminous flux traveling in the Z axis direction, while being shifted from each other by a half pitch in the Y axis direction.

Figure 6:
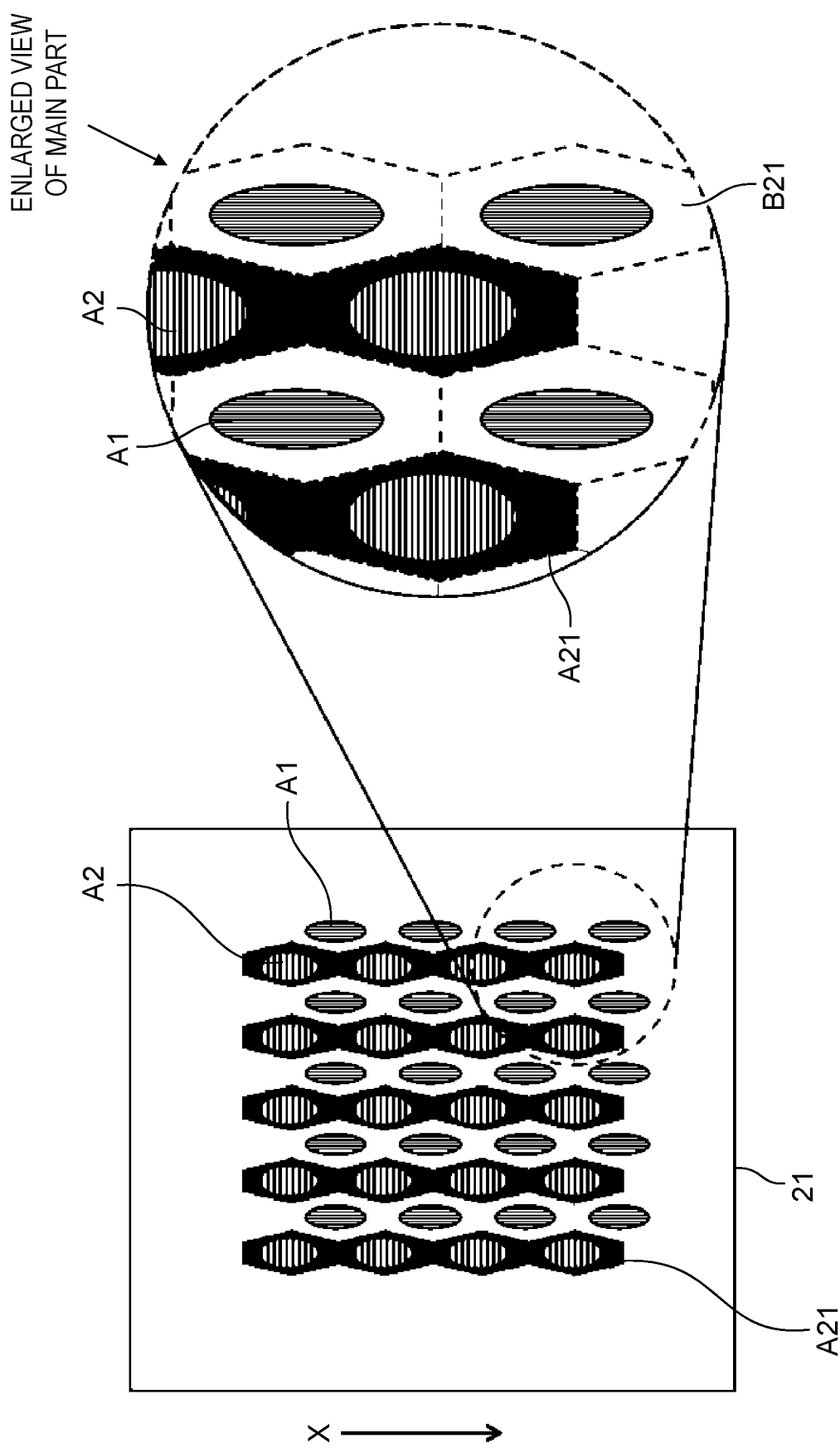
FIG. 6 is a diagram illustrating the light combining plate and an arrangement of beam spots on the light combining plate.

FIG. 6 illustrates reflection region A21 on light combining plate 21 and an arrangement of light beams A1, A2. Light combining plate 21 is a translucent substrate, has front and back surfaces both provided with antireflection films (antireflective coating), and has the front surface on which light beam A2 is incident provided with the reflection region. More specifically, for one incident light beam A1, one hexagonal transmission region B21 (defined by a dotted line in a main part enlarged view in FIG. 6) is arranged. Furthermore, for one incident light beam A2, one hexagonal reflection region A21 (defined by a dotted line in the main part enlarged view in FIG. 6) is arranged. Here, transmission region B21 is an example of a first region in which the light emitted from light emitting device 1 is incident, and reflection region A21 is an example of a second region in which the light emitted from light emitting device 2 is incident.

Thus, light emitting device 1 and light emitting device 2 are arranged in such a manner that a direction of the light beam emitted from light emitting device 1 and a direction of the light beam emitted from light emitting device 2 are orthogonal to each other (cross each other at 90°) without the light beams from light emitting device 1 and light emitting device 2 overlapping each other. Transmission region B21 of light combining plate 21 is configured to transmit at least one of light beams A1 emitted from light emitting device 1. Reflection region A21 is configured to reflect at least one of light beams A2 emitted from light emitting device 2 to make the one light beam travel in parallel with light beam A1 transmitted through transmission region B21.

Figure 7:
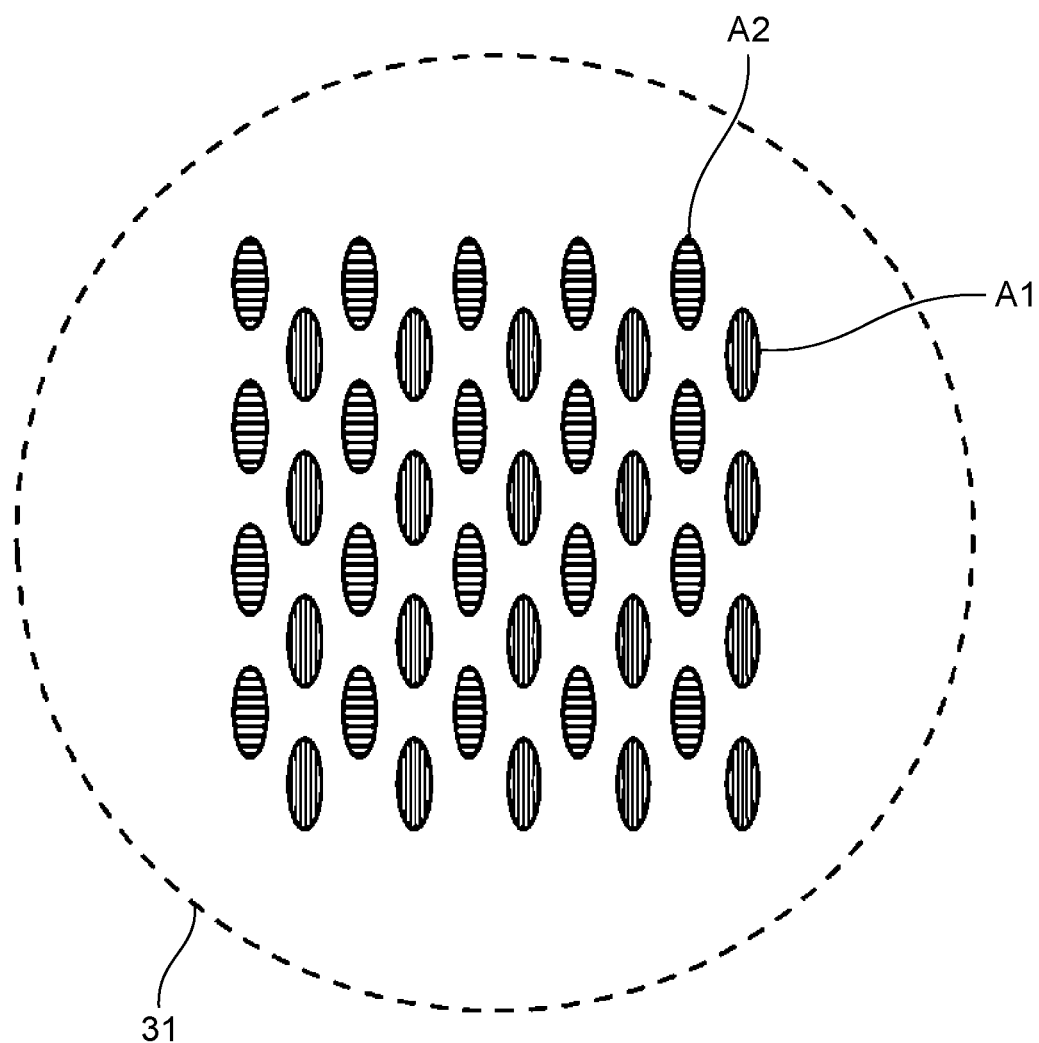
FIG. 7 is a diagram illustrating an arrangement of beam spots as a result of combination by the light source device.

As a result, with the arrangement of light beams A1 and light beams A2 emitted through light combining plate 21 of light source device 10, light beams A1 and light beams A2 that have passed through light combining plate 21 are arranged to be in a closest packed array to form a combined luminous flux, without crossing each other, as illustrated in FIG. 7.

Thus, the combined luminous flux emitted from light source device 10 can be downsized, and white light source device 100 can be downsized.

Figure 8:
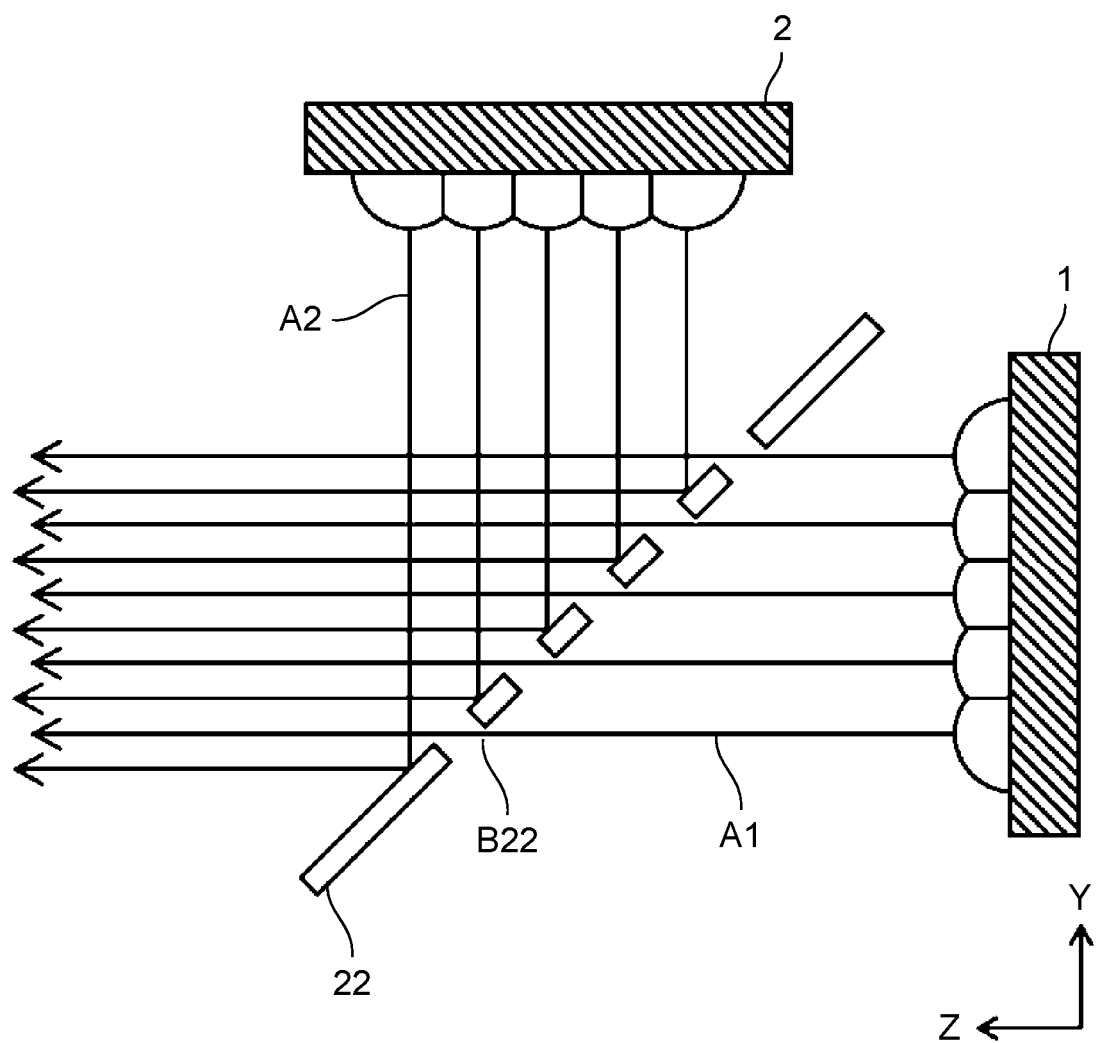
FIG. 8 is a diagram illustrating an arrangement of light emitting device 1, light emitting device 2, and a light combining plate according to a first modification.

FIG. 8 illustrates a first modification providing an effect similar to that provided with the light combining plate illustrated in FIG. 5, and illustrates light emitting devices 1, 2 and light combining plate 22 with the light source device viewed in the X axis direction. Light combining plate 22 is a substrate that has an entire surface formed of a high-reflectance mirror surface, and transmission region B22 includes an opening portion that is formed to be orthogonal to the thickness direction of the substrate. Light beam A1 from light emitting device 1 passes through transmission region B22 of light combining plate 22, light beam A2 from light emitting device 2 is reflected by light combining plate 22, and light beams A1, A2 that pass through light combining plate 22 form a single luminous flux traveling in the Z axis direction, while being shifted from each other by a half pitch in the Y axis direction as in FIG. 5.

Figure 9:
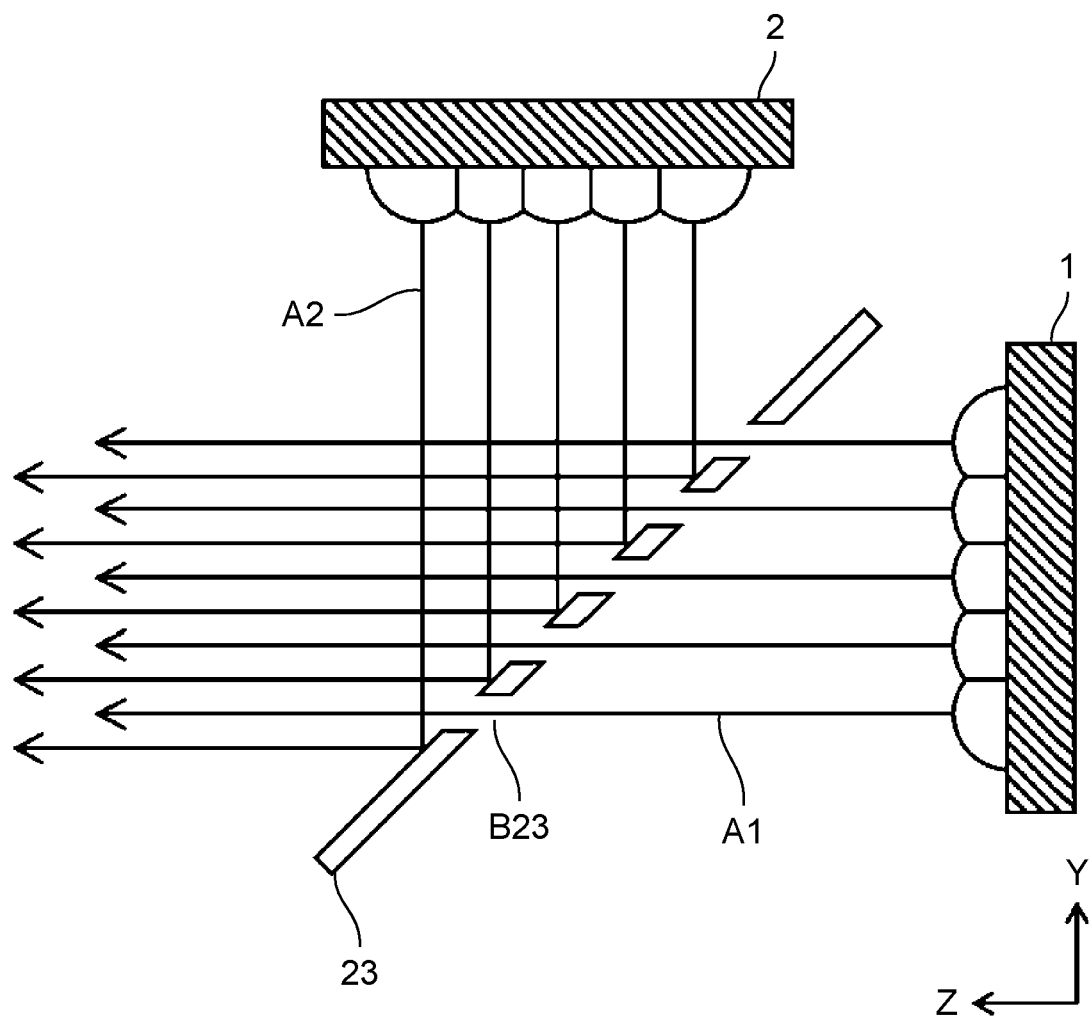
FIG. 9 is a diagram illustrating an arrangement of light emitting device 1, light emitting device 2, and a light combining plate according to a second modification.

FIG. 9 illustrates a second modification providing an effect similar to that provided with the light combining plates illustrated in FIGS. 5 and 8, and illustrates light emitting devices 1, 2 and light combining plate 23 with the light source device viewed in the X axis direction. Light combining plate 23 is a substrate that has an entire surface formed of a high-reflectance mirror surface, and transmission region B23 includes an opening portion that is formed in a traveling direction of light beam A1 with respect to the substrate. Light beam A1 from light emitting device 1 passes through transmission region B23 of light combining plate 23, light beam A2 from light emitting device 2 is reflected by light combining plate 23, and light beams A1, A2 that pass through light combining plate 23 form a single luminous flux traveling in the Z axis direction, while being shifted from each other by a half pitch in the Y axis direction as in FIGS. 5 and 8.

Figure 10:
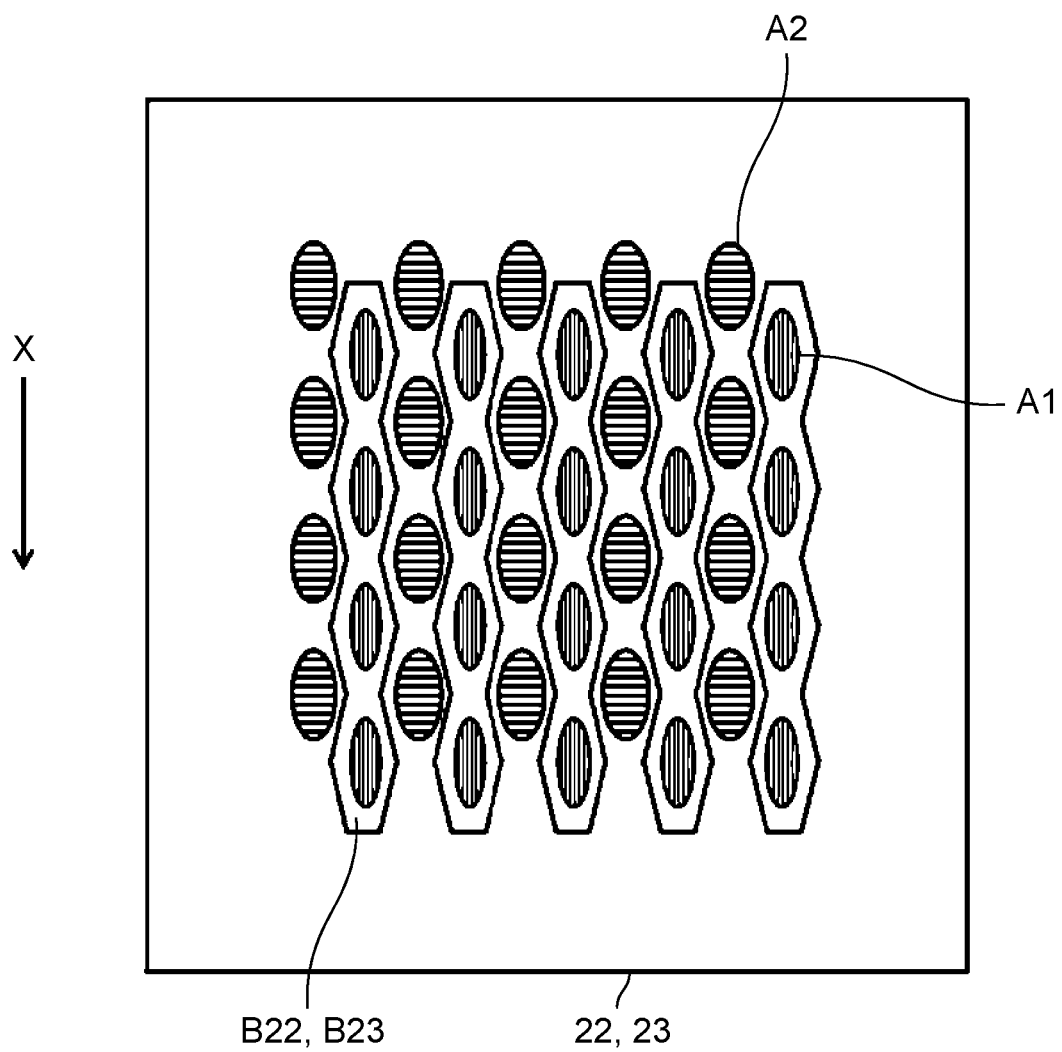
FIG. 10 is a diagram illustrating the light combining plate and an arrangement of beam spots on the light combining plate.

FIG. 10 illustrates transmission regions B22 and B23 on light combining plates 22 and 23 and an arrangement of light beams A1, A2. Light combining plates 22 and 23 are substrates that have an entire surface formed of a high-reflectance mirror surface, and have transmission regions including opening portions at portions on which light beams A1 are incident.

As in light combining plate 21 illustrated in FIG. 6, for one incident light beam A1, one transmission region including a hexagonal opening portion (in FIG. 10, adjacent hexagonal openings are arranged in series to form one long hole) is arranged. Furthermore, for one incident light beam A2, one hexagonal reflection region (in FIG. 10, a portion other than the opening portions in which the adjacent hexagonal openings are arranged in series) is provided.

1-3. Configuration of Other Optical Elements and the Like

Referring back to FIG. 1, the combined luminous flux emitted from light source device 10 is further converted into a luminous flux having a smaller diameter by lens 31 having a convex surface and lens 32 having a concave surface, and then is incident on diffuser 33. Optical axis A0 in FIG. 1 indicates the optical axis of the luminous flux emitted from light source device 10.

Diffuser 33 is made of glass and has a surface with a micro recess and protrusion shape or a microlens shape, to diffuse the incident light. Diffuser 33 has a sufficiently small diffusion angle (that is, a half value angle width indicating an angle width of light having a half of the maximum intensity of the diffused light), so that the emitted light can have the polarization characteristics of the incident light. For example, the diffusion angle is approximately 3 degrees. The emitted light from diffuser 33 is incident on waveplate 34.

Waveplate 34 is a waveplate that produces a phase difference of ¼ wavelength in the proximity of the emitted light center wavelength of each solid-state light emitting element 52. Waveplate 34 has a fine periodic structure smaller than the wavelength of light, and produces a phase difference by means of birefringence caused by the fine periodic structure. Waveplate 34 having the fine periodic structure is made of, for example, an inorganic material, features excellent durability and reliability like an inorganic optical crystal such as quartz, and is relatively inexpensive. By adjusting the angle of the optical axis of waveplate 34, the ratio between the S-polarization component and the P-polarization component with respect to the surface of subsequent dichroic mirror 35 can be adjusted. The optical axis of waveplate 34 is arranged so as to be inclined by 71.5 degrees with respect to the X axis in FIG. 1, for example. In this case, the incident light of S-polarized light is converted into light including 82% of S-polarization component and 18% of P-polarization component. The emitted light from waveplate 34 is incident on dichroic mirror 35.

Dichroic mirror 35 is characterized in that when blue light having a wavelength of 447 nm to 462 nm is incident thereon, the P-polarization component is transmitted with a high transmittance, and the S-polarization component is reflected with a high reflectance of 96% or more. Dichroic mirror 35 is further characterized in that when green light and red light are incident thereon, the P-polarization component and the S-polarization component of each light are transmitted with a high transmittance of 96% or more.

The blue light of the S-polarized light incident on dichroic mirror 35 from waveplate 34 and reflected by dichroic mirror 35 is condensed by condenser lenses 36 and 37, and then is incident on phosphor wheel device 41. The incident light on phosphor wheel device 41 is incident on a region with a spot diameter of 1.5 mm to 2.5 mm, where the spot diameter is defined as a diameter of a region with a light intensity that is 13.5% of the maximum value of the light intensity. Diffuser 33 diffuses the light to obtain a desired value of the spot diameter of the incident light on phosphor wheel device 41.

Phosphor wheel device 41 includes circular substrate 38, phosphor layer 39, and motor 40. Circular substrate 38 is made of, for example, aluminum. A reflective coating that is a metal coating or a dielectric coating reflecting visible light is formed on circular substrate 38. Further, phosphor layer 39 is formed in an annular form on the reflective coating. In phosphor layer 39, for example, a Ce-activated YAG-based yellow phosphor is formed that is excited by blue light and emits yellow light including color component light beams including green light and red light. A typical chemical composition of the crystal matrix of this phosphor is, for example, $Y_3Al_5O_{12}$. Phosphor layer 39 is excited by blue light incident from dichroic mirror 35 to generate yellow light including color component light beams including green light and red light. Motor 40 rotates circular substrate 38. The rotation of circular substrate 38 moves the incident position of the blue light from dichroic mirror 35 on phosphor layer 39, thereby suppressing the temperature rise of phosphor layer 39 due to the excitation by the blue light, so that fluorescence conversion efficiency can be stably maintained. A part of light generated by phosphor layer 39 travels in the +Y direction, and the other part of the light travels in the −Y direction and then is reflected in the +Y direction.

The yellow light emitted from phosphor wheel device 41 becomes natural light, is condensed again by condenser lenses 37, 36 to be converted into substantially parallel light, and then passes through dichroic mirror 35.

On the other hand, the blue light of the P-polarized light incident on dichroic mirror 35 from waveplate 34 and transmitted through dichroic mirror 35 is incident on condenser lens 42 to be condensed. The focal length of condenser lens 42 is set to have a focusing angle of, for example, 40 degrees or less so as to form a focusing spot in the proximity of reflector 45. The emitted light from condenser lens 42 is incident on diffuser 43.

Diffuser 43 is made of glass and has a surface with a micro recess and protrusion shape or a microlens shape, to diffuse the incident light. Diffuser 43 diffuses the incident light to achieve a uniform light intensity distribution, and remove speckle in the laser beam. Diffuser 43 has a sufficiently small diffusion angle, for example, such that the emitted light can have the polarization characteristics of the incident light. For example, the diffusion angle is approximately 4 degrees. The emitted light from diffuser 43 is incident on waveplate 44.

Waveplate 44 is a waveplate that produces a phase difference of ¼ wavelength in the proximity of the emitted light center wavelength of each solid-state light emitting element 52. Waveplate 44 has a fine periodic structure smaller than the wavelength of light, and produces a phase difference by means of birefringence caused by the fine periodic structure. The optical axis of waveplate 44 is arranged so as to be inclined by 45 degrees with respect to the X axis in FIG. 1, for example. In this case, the incident light of S-polarized light is converted into emitted light of circularly polarized light. Waveplate 44 with the fine periodic structure has extremely low dependency on the incident angle, and thus can convert the incident light of linearly polarized light into circularly polarized light as emitted light with high efficiency, even when waveplate 44 is arranged at a position on which condensed light or divergent light instead of parallel light is incident. Waveplate 44 is arranged at a position on which condensed light or divergent light is incident, and thus can be downsized to be not larger than half the size of that to be arranged at a position on which parallel light is incident, whereby the cost thereof can be reduced. The emitted light from waveplate 44 is incident on reflector 45.

On reflector 45, a reflective coating such as aluminum or a dielectric multilayer coating is formed. The light incident on reflector 45 from waveplate 44 is reflected by reflector 45 to have the phase inverted, meaning that the incident light of circularly polarized light becomes reflected light of light circularly polarized in the opposite direction. Further, the light incident on reflector 45 from waveplate 44 is reflected by reflector 45, so that the condensed light becomes diffused light. The reflected light from reflector 45 is incident on waveplate 44 again, to be converted from the circularly polarized light into S-polarized light by waveplate 44. Since no member that disturbs polarization is arranged between waveplate 44 and reflector 45, conversion from P-polarized light to S-polarized light can be implemented with high efficiency. Next, the emitted light from waveplate 44 is diffused again by diffuser 43, the emitted light from diffuser 43 is converted into parallel light by condenser lens 42, and the emitted light from condenser lens 42 is incident on dichroic mirror 35. The incident light from condenser lens 42 to dichroic mirror 35 is S-polarized light, and thus is reflected by dichroic mirror 35.

The yellow light incident on dichroic mirror 35 from phosphor wheel device 41 and transmitted therethrough, and the blue light incident on dichroic mirror 35 from reflector 45 and reflected thereon are combined with each other to be white light. White light source device 100 outputs the combined white light. By combining the blue light generated by the semiconductor laser element and the yellow light including color component light beams including the green light and the red light generated by exciting the phosphor, the spectral characteristic with excellent white balance can be achieved. With this spectral characteristic, even if the optical system of the projection display apparatus separates light into light beams of the three primary color lights, which are blue light, green light, and red light, monochromatic light having desired chromaticity coordinates can be obtained.

In the first exemplary embodiment, light emitting devices 1, 2 of light source device 10 and the light combining plate may be arranged at different intervals.

In the first exemplary embodiment, the case where waveplate 34 and waveplate 44 are described to have a fine periodic structure. Waveplate 34 and waveplate 44 may each be a thin film waveplate utilizing birefringence obtained by oblique vapor deposition of a dielectric material.

1-4. Effects and the Like

According to the first exemplary embodiment, light source device 10 includes a plurality of light emitting devices and the light combining plate. Each light emitting device includes substrate 51, as well as the plurality of solid-state light emitting elements 52 and the plurality of lenses 53 arranged in a two dimensional array on substrate 51. The light combining plate includes a first region and a second region.

Light emitting device 1 and light emitting device 2 are so arranged that the direction of the light beams emitted from light emitting device 1 and the direction of the light beams emitted from light emitting device 2 are orthogonal to each other and the light beams from light emitting device 1 and light emitting device 2 do not overlap. The first region transmits at least one of the light beams emitted from light emitting device 1 and the second region reflects at least one of the light beams emitted from light emitting device 2 to be in parallel with the light beam transmitted through the first region. Beam spots of the light beams transmitted through or reflected by the light combining plate form a closest packed array.

With this configuration, the light beams from the plurality of light emitting devices can be highly efficiently combined without wasteful use of a space.

According to the first exemplary embodiment, light emitting device 1 and light emitting device 2 of light source device 10 may be arranged to minimize the distances between light emitting device 1 and the light combining plate and between light emitting device 2 and the light combining plate, as viewed along the optical axis of white light source device 100.

With this configuration, the light beams from the plurality of light emitting devices can be more highly efficiently combined without wasteful use of a space.

According to the first exemplary embodiment, each of solid-state light emitting elements 52 may be a blue semiconductor laser element.

With this configuration, the light source device can output blue light, output light including the blue light as a color component, or output light with another color excited by the blue light.

According to the first exemplary embodiment, light emitting device 1 and light emitting device 2 may emit linearly polarized light.

With this configuration, the light beams generated by the light emitting devices can be separated and combined using the dichroic mirror.

According to the first exemplary embodiment, white light source device 100 may include: dichroic mirror 35 on which light beams from light emitting devices 1, 2 are incident and in which first and second color component light beams different from each other are separated and combined; phosphor wheel device 41 that is excited by the first color component light beam to generate fluorescence; and waveplate 44 that converts the second color component light beam of linearly polarized light into circularly polarized light.

With this configuration, white light can be output using a light emitting device emitting blue light, for example.

According to the first exemplary embodiment, phosphor wheel device 41 may include phosphor layer 39 in which a Ce-activated YAG-based yellow phosphor is formed, phosphor layer 39 being formed on circular substrate 38 that rotates.

With this configuration, white light can be output using a light emitting device emitting blue light.

With the light emitting devices arranged as described above, light beams can be arranged close to each other with wasteful use of a space suppressed by the close packed arrangement in a two dimensional array form. Thus, the luminous fluxes from the light emitting devices can be close to each other. Thus, the combined luminous flux emitted from the light source device can be downsized, and the white light source device can be downsized. All things considered, a small high-brightness white light source device can be provided.

Second Exemplary Embodiment

White light source device 100 according to the first exemplary embodiment can be applied to, for example, a projection display apparatus. In a second exemplary embodiment, a projection display apparatus is described that uses white light source device 100 and uses, as light modulation elements, transmissive liquid crystal panels that operate in a Twisted Nematic (TN) mode or a Vertical Alignment (VA) mode, and adopt an active matrix scheme with a thin film transistor formed on a pixel region.

2-1. Overall Configuration

Figure 11:
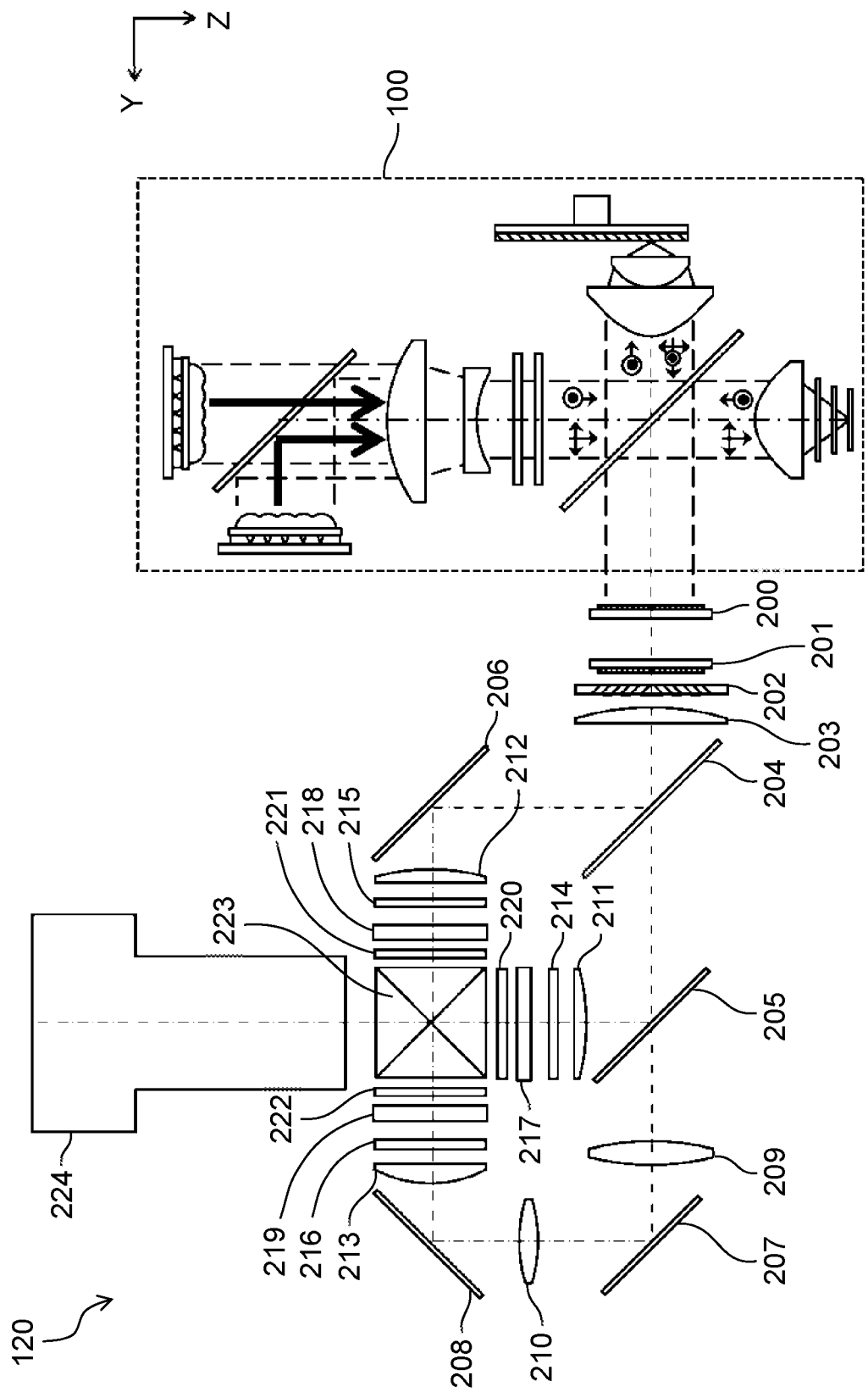
FIG. 11 is a schematic view illustrating a configuration of a projection display apparatus according to a second exemplary embodiment.

FIG. 11 is a schematic view illustrating a configuration of a projection display apparatus according to the second exemplary embodiment. Projection display apparatus 120 in FIG. 11 includes: white light source device 100; first illumination lens array plate 200; second illumination lens array plate 201; polarization conversion element 202; superimposing lens 203; blue reflecting dichroic mirror 204; green reflecting dichroic mirror 205; reflection mirrors 206, 207, 208; relay lenses 209, 210, field lenses 211, 212, 213; incident side polarizing plates 214, 215, 216; liquid crystal panels 217, 218, 219; emission side polarizing plates 220, 221, 222; color combining prism 223; and projection optical system 224.

The white light from white light source device 100 is incident on first illumination lens array plate 200 including a plurality of lens elements. The luminous flux incident on first illumination lens array plate 200 is divided into a large number of luminous fluxes. The large number of divided luminous fluxes converge on second illumination lens array plate 201 including a plurality of lens elements. The lens elements of first illumination lens array plate 200 have aperture shapes similar to those of liquid crystal panels 217 to 219. The focal length of each lens element of second illumination lens array plate 201 is determined to make first illumination lens array plate 200 and liquid crystal panels 217 to 219 be in a substantially conjugated relationship. The light emitted from second illumination lens array plate 201 is incident on polarization conversion element 202.

Polarization conversion element 202 includes a polarized light splitting prism and a half wavelength plate, and converts natural light from a light source into light in one polarization direction. Fluorescent light is natural light, and the natural light is polarized and converted to be in one polarization direction. Meanwhile, blue light is incident as P-polarized light, and is converted into S-polarized light. The emitted light from polarization conversion element 202 is incident on superimposing lens 203.

Superimposing lens 203 is a lens for superimposing light beams from the respective lens elements of second illumination lens array plate 201 and emitting the resultant light onto liquid crystal panels 217 to 219.

First and the second illumination lens array plates 200, 201, polarization conversion element 202, and superimposing lens 203 form an illumination optical system. This illumination optical system is an example of an illumination device.

The emitted light from superimposing lens 203 is split into blue light, green light, and red light by blue reflecting dichroic mirror 204 and green reflecting dichroic mirror 205 serving as color splitting units. The green light passes through field lens 211 and incident side polarizing plate 214 and then is incident on liquid crystal panel 217. After being reflected by reflection mirror 206, the blue light passes through field lens 212 and incident side polarizing plate 215 and then is incident on liquid crystal panel 218. The red light is transmitted through, refracted, and reflected by relay lenses 209, 210 and reflection mirrors 207, 208. The light further passes through field lens 213 and incident side polarizing plate 216, to be incident on liquid crystal panel 219.

On both sides of liquid crystal panels 217 to 219, incident side polarizing plates 214 to 216 and emission side polarizing plates 220 to 222 are arranged with their transmission axes being orthogonal to each other. Liquid crystal panels 217 to 219 change the polarization state of the incident light to spatially modulate the incident light, with voltage applied to their pixels controlled in accordance with an image signal, to form image light including the green light, the blue light, and the red light.

Color combining prism 223 includes a red reflecting dichroic mirror and a blue reflecting dichroic mirror. Of the image light including the colors transmitted through emission side polarizing plates 220 to 222, the green light passes through color combining prism 223, the red light is reflected by the red reflecting dichroic mirror of color combining prism 223, and the blue light is reflected by the blue reflecting dichroic mirror of color combining prism 223. As a result, the transmitted green light is combined with the reflected red light and blue light and the resultant light is incident on projection optical system 224. The light incident on projection optical system 224 is projected on a screen (not illustrated) in an enlarged manner.

White light source device 100, including a plurality of light emitting devices and configured to be small, highly efficiently outputs white light with excellent white balance. Thus, a small high-brightness projection display apparatus can be implemented. Three liquid crystal panels 217 to 219 utilizing polarization, instead of time division schemes, are used as the light modulation elements. Thus, a bright and high-definition projection image with excellent color reproduction and free of color breaking can be obtained. Furthermore, no total reflection prism is required, and the color combining prism is a small 45-degree incident prism. Thus, the projection display apparatus can be configured to have a size smaller than a display apparatus in a case where three DMD elements are used as the light modulation elements.

In the second exemplary embodiment, the case where the transmissive liquid crystal panels are used as the light modulation elements is described. Alternatively, reflective liquid crystal panels may be used. By using the reflective liquid crystal panels, a projection display apparatus can be configured to feature a smaller size and a higher definition.

2-2. Effects and the Like

According to the second exemplary embodiment, the projection display apparatus includes: white light source device 100 according to the first exemplary embodiment; an illumination optical system that transmits light from white light source device 100; light modulation elements that spatially modulate light incident via the illumination optical system, in accordance with an image signal; and a projection optical system that projects the light modulated by the light modulation elements. The light modulation elements may be liquid crystal panels 217 to 219.

With this configuration, a small high-brightness projection display apparatus can be provided.

Third Exemplary Embodiment

In a third exemplary embodiment, a projection display apparatus using white light source device 100 and using digital micromirror devices (DMD) as light modulation elements will be described.

3-1. Overall Configuration

FIG. 12 is a schematic view illustrating a configuration of a projection display apparatus according to the third exemplary embodiment. Projection display apparatus 130 illustrated in FIG. 12 includes white light source device 100, condensing lens 300, rod 301, relay lens 302, reflection mirror 303, field lens 304, total reflection prism 305, air layer 306, color prism 307, blue reflecting dichroic mirror 308, red reflecting dichroic mirror 309, DMDs 310, 311, 312, and projection optical system 313.

White light source device 100 in FIG. 12 is white light source device 100 according to the first exemplary embodiment.

The white light emitted from white light source device 100 is incident on condensing lens 300 and is condensed on rod 301. The light incident on rod 301 is reflected a plurality of times inside the rod, and is then emitted with the light intensity distribution uniformized. The emitted light from rod 301 is collected by relay lens 302, reflected by reflection mirror 303, and passes through field lens 304 to be incident on total reflection prism 305.

Total reflection prism 305 includes two prisms, with thin air layer 306 formed between proximal surfaces of the prisms. Air layer 306 totally reflects incident light at an angle equal to or more than the critical angle. The emitted light from field lens 304 is reflected by the total reflection surface of total reflection prism 305 to be incident on color prism 307.

Color prism 307 includes three prisms, and blue reflecting dichroic mirror 308 and red reflecting dichroic mirror 309 are formed on the proximal surfaces of the prisms. The incident light is split into blue light, red light, and green light by blue reflecting dichroic mirror 308 and red reflecting dichroic mirror 309 of color prism 307 to be respectively incident on DMDs 310 to 312.

DMDs 310 to 312 deflect the respective micromirrors according to the image signal, to separate the incident light into reflected light directed toward projection optical system 313 and reflected light traveling to the outside of the effective range of projection optical system 313. The light reflected by DMDs 310 to 312 passes through color prism 307 again.

In the process of passing through color prism 307, the blue light, the red light, and the green light that have been split are combined with each other, and then the resultant light is incident on total reflection prism 305. The light incident on total reflection prism 305 is incident on air layer 306 at the critical angle or less, and thus passes through total reflection prism 305 to be incident on projection optical system 313. The image light thus formed by DMDs 310 to 312 is projected onto a screen (not illustrated) in an enlarged manner.

White light source device 100, including a plurality of light emitting devices and configured to be small, highly efficiently outputs white light with excellent white balance. Thus, a small high-brightness projection display apparatus can be implemented. With the DMDs 310 to 312 used as the light modulation elements, the projection display apparatus featuring high light resistance and heat resistance can be obtained compared with a case of the light modulation elements using the liquid crystal panels. With three DMDs 310 to 312 used, a bright and high-definition projected image featuring excellent color reproduction can be obtained.

In the third exemplary embodiment, the case where three DMDs 310 to 312 are used as the light modulation elements is described. Alternatively, one DMD may be used for the configuration. By using one DMD, a smaller projection display apparatus can be configured.

3-2. Effects and the Like

According to the third exemplary embodiment, the projection display apparatus includes: white light source device 100 according to the first exemplary embodiment; an illumination optical system that transmits light from white light source device 100; light modulation elements that spatially modulate light incident via the illumination optical system, in accordance with an image signal; and a projection optical system that projects the light modulated by the light modulation elements. Digital micromirror devices 310 to 312 can be used as the light modulation elements.

With this configuration, a small high-brightness projection display apparatus can be provided.

Fourth Exemplary Embodiment

4-1. Configuration

FIG. 13 is a schematic view illustrating a configuration of light source device 14 according to a fourth exemplary embodiment. Light source device 14 includes four light emitting devices 401, 402, 403, 404, two light combining plates 441, 443, polarized beam splitter 442, and waveplate 444.

Each of four light emitting devices 401, 402, 403, 404 has substantially the same configuration as light emitting device 1 and light emitting device 2 described in the first exemplary embodiment. Specifically, the devices each have a substrate, a plurality of solid-state light emitting elements, a plurality of lenses, a housing, and electrodes. Still, the solid-state light emitting elements of light emitting devices 401, 402, 403, 404 will be described as elements emitting green light of S-polarized light.

The arrangement and configuration of light emitting devices 401, 402 and light combining plate 441 are substantially the same as those of light emitting device 1, light emitting device 2, and light combining plate 21 described in the first exemplary embodiment. Light emitting devices 401, 402 and light combining plate 441 respectively correspond to light emitting devices 1, 2 and light combining plate 21. That is, light combining plate 441 is a translucent substrate having antireflection films provided on both the front and back surfaces. One surface of the substrate has a plurality of reflection regions A41 provided with a plurality of reflective coatings in a two dimensional array form. Each of the plurality of reflection regions A41 has a hexagonal shape as in the case of reflection region A21 illustrated in FIG. 6, and transmission region B41 is provided in a portion of light combining plate 441 other than reflection region A41 as in transmission region B21 illustrated in FIG. 6. Here, transmission region B41 is an example of the first region, and reflection region A41 is an example of the second region.

As illustrated in FIG. 13, light beam B1 from light emitting device 401 (an example of the first light emitting device) passes through transmission region B41 of light combining plate 441 (an example of the first light combining plate) to be incident on waveplate 444. Light beam B2 from light emitting device 402 (an example of the second light emitting device) is reflected by reflection region A41 of light combining plate 441 to be incident on waveplate 444. Light beams B1, B2 form a closest packed array while being shifted from each other by half a pitch in each of the X axis direction and the Y axis direction, and thus form a single combined luminous flux traveling in the Z axis direction.

Waveplate 444 is a half wavelength plate and converts S-polarized light into P-polarized light (or converts P-polarized light into S-polarized light). Light beam B1 and light beam B2 incident on waveplate 444 are S-polarized light and are converted into P-polarized light by passing through waveplate 444, to be incident on polarized beam splitter 442.

In the present exemplary embodiment, polarized beam splitter 442 reflects green (wavelength 515 nm to 535 nm) S-polarized light with a high reflectance (96% or more) and transmits P-polarized light with a high transmittance (96% or more). Thus, light beams B1, B2 from light emitting devices 401, 402 that have passed through waveplate 444 and been converted into P-polarized light pass through polarized beam splitter 442. As illustrated in FIG. 13, light beam B3 from light emitting device 403 (an example of a third light emitting device) is S-polarized light and is reflected by polarized beam splitter 442, and the emission direction is converted by 90° to be incident on light combining plate 443 (an example of a second light combining plate).

Light combining plate 443 is a translucent substrate having antireflection films provided on both the front and back surfaces. One surface of the substrate has a plurality of reflection regions A43 provided with a plurality of polarized beam splitter reflective coatings in a two dimensional array form. Each of the plurality of reflection regions A43 has a hexagonal shape as in the case of reflection region A21 illustrated in FIG. 6, and transmission region B43 is provided in a portion of light combining plate 443 other than reflection region A43 as in transmission region B21 illustrated in FIG. 6. Here, transmission region B43 is an example of a third region, and reflection region A43 is an example of a fourth region.

As illustrated in FIG. 13, light beam B3 from light emitting device 403 is arranged so as to be incident on transmission region B43 of light combining plate 443, passes through light combining plate 443, and travels in the Z axis direction. Further, light beam B4 from light emitting device 404 (an example of a fourth light emitting device) is reflected by reflection region A43 of light combining plate 443 and travels in the Z axis direction. light beam B3 that has passed through light combining plate 443 and light beam B4 reflected by light combining plate 443 form a closest packed array while being shifted from each other by half a pitch in each of the X axis direction and the Y axis direction, and thus form a single combined luminous flux traveling in the Z axis direction.

Light beams B1, B2 from light emitting devices 401, 402 transmitted through polarized beam splitter 442 and incident on light combining plate 443 are P-polarized light and pass through light combining plate 443. Thus, light source device 14 outputs light as a combination of light beams B1, B2 forming the closest packed array and light beams B3, B4 forming the closest packed array.

In the present exemplary embodiment, as illustrated in FIG. 13, light emitting devices 401, 402 and light combining plates 441, 443 are arranged such that light beam B1 from light emitting device 401 passes through transmission region B43 of light combining plate 443, and light beam B2 from light emitting device 402 passes through reflection region A43 of light combining plate 443. Alternatively, the plates and the devices may be arranged such that light beam B1 passes through reflection region A43 and light beam B2 passes through transmission region B43. Further, light beams B1, B2 from light emitting devices 401, 402 incident on light combining plate 443 are P-polarized light and pass through light combining plate 443 regardless of reflection region A43 and transmission region B43. The arrangement of the solid-state light emitting elements of light emitting devices 401, 402 is not necessarily the same as that of the solid-state light emitting elements of the light emitting devices 403, 404.

4-2. Effects and the Like

According to the fourth exemplary embodiment, light beams B1, B2 forming the closest packed array due to light emitting devices 401, 402 and light combining plate 441, and light beams B3, B4 forming the closest packed array due to light source devices 403, 404 and light combining plate 443 can be combined. Thus, the size of the combined luminous flux emitted from the light source device can be small, whereby a small and high-brightness light source device can be provided.

In the fourth exemplary embodiment, green semiconductor lasers are used as the solid-state light emitting elements of light emitting devices 401, 402, 403, 404, but alternatively red or blue semiconductor lasers may be used.

In the fourth exemplary embodiment, the green light source device using the green semiconductor lasers as the solid-state light emitting elements of light emitting devices 401, 402, 403, 404 is described. Alternatively, the device may be combined with other red and blue light source devices, to be formed as a light source device emitting white light. Such a light source device emitting white light can be used instead of white light source device 100 of projection display apparatuses 120, 130 illustrated in FIG. 11 and FIG. 12.

Fifth Exemplary Embodiment

5-1. Configuration

FIG. 14 is a schematic view illustrating a configuration of light source device 15 according to a fifth exemplary embodiment. Light source device 15 includes three light emitting devices 501, 502, 503, light combining plate 551, and dichroic mirror 552.

Each of three light emitting devices 501, 502, 503 has substantially the same configuration as light emitting devices 1, 2 described in the first exemplary embodiment. Specifically, the devices each have a substrate, a plurality of solid-state light emitting elements, a plurality of lenses, a housing, and electrodes. However, in the fifth exemplary embodiment, the solid-state light emitting elements of light emitting devices 501, 502 will be described as elements emitting green light, and the solid-state light emitting elements of light emitting device 503 (an example of the third light emitting device) as an element emitting red light.

Light combining plate 551 (an example of the first light combining plate) is a translucent substrate having antireflection films provided on both the front and back surfaces. One surface of the substrate has a plurality of reflection regions A51 provided with a plurality of dichroic reflective coatings in a two dimensional array form. Each of the plurality of reflection regions A51 has a hexagonal shape as in the case of reflection region A21 illustrated in FIG. 6, and transmission region B51 is provided in a portion of light combining plate 551 other than reflection region A51 as in transmission region B21 illustrated in FIG. 6. Here, transmission region B51 is an example of the first region, and reflection region A51 is an example of the second region. In the present exemplary embodiment, the dichroic reflective coating is characterized to reflect green light (wavelength 515 nm to 535 nm) with a high reflectance (96% or more) and transmit red light (wavelength 630 nm to 650 nm) and blue light (wavelength 430 nm to 480 nm) with a high transmittance (96% or more).

Dichroic mirror 552 has the same characteristics as the dichroic reflective coating of light combining plate 551, and is characterized to reflect green light with a high reflectance (96% or more) and transmit red light with a high transmittance (96% or more).

As illustrated in FIG. 14, green light beam C1 emitted from light emitting device 501 (an example of the first light emitting device) is incident on dichroic mirror 552 at an incident angle of about 45°, and the emission direction is converted by about 90° to travel in the Z axis direction, to be incident on transmission region B51 of light combining plate 551, and thus pass through light combining plate 551. Green light beam C2 emitted from light emitting device 502 (an example of the second light emitting device) is incident on reflection region A51 of light combining plate 551 at an incident angle of about 45° and is reflected, and the emission direction is converted by about 90° to travel in the Z axis direction. Light beam C1 and light beam C2 emitted from light combining plate 551 form a closest packed array while being shifted from each other by half a pitch in each of the X axis direction and the Y axis direction, and thus form a single combined luminous flux traveling in the Z axis direction.

As illustrated in FIG. 14, red light beam C3 emitted from light emitting device 503 is incident on dichroic mirror 552 at an incident angle of about 45° to pass through dichroic mirror 552, pass through transmission region B51 of light combining plate 551, and travel in the Z axis direction. As a result, light source device 15 emits light as a combination of green light beams C1, C2 and red light beam C3 in the closest packed array.

In the present exemplary embodiment, light emitting device 503 and light combining plates 551, 552 are arranged such that red light beam C3 from light emitting device 503 passes through transmission region B51 of light combining plate 551. Since light beam C3 is red light, it can pass through light combining plate 551 with a high transmittance, also when the device and the plates are arranged to make light beam C3 incident on reflection region A51, which is a dichroic reflective coating. Light beam C3 emitted from light emitting device 503 is red light, and passes through light combining plate 551 regardless of reflection region A51 and transmission region B51 with a high transmittance. Thus, the array of the solid-state light emitting elements of light emitting device 503 and the arrays of the solid-state light emitting elements of light emitting devices 501 are not necessarily the same. Thus, even when the arrays of the solid-state light emitting elements of light emitting devices 501 are a 4×5 two dimensional array as illustrated in FIG. 2, the array of the solid-state light emitting elements of light emitting device 503 may be a different two dimensional array, such as a 5×5 two dimensional array.

5-2. Effects and the Like

According to the fifth exemplary embodiment, light beams C1, C2 combine so as to form the closest packed array by light emitting devices 501, 502 and light combining plate 551, and light beam C3 from light emitting device 503 can be combined, so that the combined luminous flux emitted from the light source device can be downsized, whereby a smaller and high-brightness light source device can be provided.

In the fifth exemplary embodiment, green semiconductor lasers are used as the solid-state light-emitting elements of light-emitting devices 501, 502, and red semiconductor lasers used as the solid-state light-emitting elements of the light-emitting device 503. Alternatively, blue semiconductor lasers may be used as the solid-state light emitting elements of light emitting device 503. For example, the light beams emitted from light emitting devices 501, 502 can be set to be blue light and the light beam emitted from light emitting device 503 can be set to be red light, by selecting the reflection and transmission characteristics of the dichroic reflective coating forming reflection region A51 and dichroic mirror 552 in accordance with the colors of the light beams emitted from light emitting devices 501, 502, 503.

Further, light source device 15 described in the fifth exemplary embodiment emits a combination of green light and red light, but may be combined with light source devices of other colors (for example, a blue light source device and a light source device that emits a combination of blue light and red light) to be configured to emit white light. Such a light source device emitting white light can be used instead of white light source device 100 of projection display apparatuses 120, 130 illustrated in FIG. 11 and FIG. 12.

Sixth Exemplary Embodiment

6-1. Configuration

FIG. 15 is a schematic view illustrating a configuration of light source device 16 according to a sixth exemplary embodiment. Light source device 16 includes six light emitting devices 601, 602, 603, 604, 605, 606, three light combining plates 661, 662, 663, two dichroic mirrors 664, 665 and two reflection mirrors 666, 667.

Each of six light emitting devices 601, 602, 603, 604, 605, 606 has substantially the same configuration as light emitting devices 1, 2 described in the first exemplary embodiment. Specifically, the devices each have a substrate, a plurality of solid-state light emitting elements, a plurality of lenses, a housing, and electrodes. However, in the sixth exemplary embodiment, the solid-state light emitting elements of light emitting devices 601, 602 emit blue light (wavelength 457 nm to 472 nm), and the solid light emitting elements of light emitting devices 603, 604 emit red light (wavelength 630 nm to 650 nm), and the solid-state light emitting elements of light emitting devices 605, 606 emit green light (wavelength 515 nm to 535 nm).

The arrangement and configuration of light emitting devices 601, 602 and light combining plate 661 (an example of the first light combining plate) are substantially the same as those of light emitting devices 1, 2, and light combining plate 21 described in the first exemplary embodiment. Further, reflection region A61 and transmission region B61 of light combining plate 661 respectively correspond to reflection region A21 and transmission region B21 of light combining plate 21. Here, transmission region B61 is an example of the first region, and reflection region A61 is an example of the second region. Blue light beam D1 emitted from light emitting device 601 (an example of the first light emitting device) and blue light beam D2 emitted from light emitting device 602 (an example of the second light emitting device) are combined by light combining plate 661, and form a closest packed array while being shifted from each other by half pitch in each of the X axis direction and the Y axis direction to form a single combined luminous flux traveling in the Z axis direction.

Light combining plate 662 (an example of the second light combining plate) is a translucent substrate having antireflection films provided on both the front and back surfaces. One surface of the substrate has a plurality of reflection regions A62 provided with a plurality of dichroic reflective coatings in a two dimensional array form. Each of the plurality of reflection regions A62 has a hexagonal shape as in the case of reflection region A21 illustrated in FIG. 6, and transmission region B62 is provided in a portion of light combining plate 662 other than reflection region A62 as in transmission region B21 illustrated in FIG. 6. Here, transmission region B62 is an example of the third region, and reflection region A62 is an example of the fourth region. In the present exemplary embodiment, the dichroic reflective coating is characterized to reflect red light (wavelength 630 nm to 650 nm) with a high reflectance (96% or more) and transmit blue light (wavelength 430 nm to 480 nm) with a high transmittance (96% or more).

Dichroic mirror 664 has the same characteristics as the dichroic reflective coating of light combining plate 662, and is characterized to reflect red light with a high reflectance (96% or more) and transmit blue light with a high transmittance (96% or more).

Light combining plate 663 (an example of a third light combining plate) has the same configuration as light combining plate 661 (that is, light combining plate 21 of the first exemplary embodiment). Reflection region A63 and transmission region B63 of light combining plate 663 respectively correspond to reflection region A21 and transmission region B21 of light combining plate 21. Here, transmission region B63 is an example of a fifth region, and reflection region A63 is an example of a sixth region. Green light beam D5 emitted from light emitting device 605 (an example of a fifth light emitting device) is incident on reflection mirror 666 at an incident angle of about 45°, and the emission direction is converted by about 90° to travel in the Z axis direction, to be incident on transmission region B63 of light combining plate 663, and thus pass through light combining plate 663. Green light beam D6 emitted from light emitting device 606 (an example of a sixth light emitting device) is incident on reflection region A63 of light combining plate 663 at an incident angle of about 45° and is reflected, and the emission direction is converted by about 90° to travel in the Z axis direction. Light beam D5 and light beam D6 emitted from light combining plate 663 form a closest packed array while being shifted from each other by half a pitch in each of the X axis direction and the Y axis direction, and thus form a single combined luminous flux traveling in the Z axis direction. In this configuration employed, green light beam D5 emitted from light emitting device 605 is reflected by reflection mirror 666 and is incident on transmission region B63 of light combining plate 663. Alternatively, a configuration as in light emitting device 601 may be employed. Specifically, the light beam may be directly incident on transmission region B63 of light combining plate 663 in the Z axis direction, without being reflected by reflection mirror 666.

As illustrated in FIG. 15, red light beam D3 emitted from light emitting device 603 (an example of the third light emitting device) is incident on dichroic mirror 664 at an incident angle of about 45°, and the emission direction is converted by about 90° to travel in the Z axis direction, to be incident on transmission region B62 of light combining plate 662, and thus pass through light combining plate 662. Red light beam D4 emitted from light emitting device 604 (an example of the fourth light emitting device) is incident on reflection region A62 of light combining plate 662 at an incident angle of about 45° and is reflected, and the emission direction is converted by about 90° to travel in the Z axis direction. Red light beam D3 and light beam D4 emitted from light combining plate 662 form a closest packed array while being shifted from each other by half a pitch in each of the X axis direction and the Y axis direction, and thus form a single combined luminous flux traveling in the Z axis direction.

As illustrated in FIG. 15, blue light beams D1, D2 from light emitting devices 601, 602 combined to be in a closest packed array by light combining plate 661 are incident on dichroic mirror 664 at an incident angle of about 45°, pass through dichroic mirror 664, pass through transmission region B62 of light combining plate 662, and are combined with red light beams D3, D4 from light emitting devices 603, 604 combined to be in a closest packed array by light combining plate 662. Then, the resultant light is incident on reflection mirror 667. Blue light beams D1, D2 and red light beams D3, D4 combined by light combining plate 662 are incident on reflection mirror 667 at an incident angle of about 45°, and the emission direction is converted by about 90° to travel in the Y axis direction. The resultant light is incident on dichroic mirror 665 at an incident angle of about 45° and is reflected, and the emission direction is converted by about 90° to travel in the Z axis direction. Then, the resultant light is emitted from light source device 16. Here, dichroic mirror 665 is characterized to reflect red light and blue light at a high reflectance (96% or more) and transmit green light with a high transmittance (96% or more). Thus, blue light beams D1, D2 as well as red light beams D3, D4 are reflected by dichroic mirror 665.

As illustrated in FIG. 15, a combination of green light beams D5, D6 from light emitting devices 605, 606 in the closest packed array obtained by light combining plate 663 is incident on dichroic mirror 665 at an incident angle of about 45°, passes through dichroic mirror 665, and then is emitted from light source device 16. Thus, the combination of blue light beams D1, D2 in a closest packed array, the combination of red light beams D3, D4 in a closest packed array, and the combination of green light beams D5, D6 in a closest packed array are ultimately combined by dichroic mirror 665 into white light to be emitted from light source device 16.

In the present exemplary embodiment, light emitting devices 601, 602, light combining plates 661, 662, and dichroic mirror 664 are arranged such that blue light beams D1, D2 from light emitting devices 601, 602 pass through transmission region B62 of light combining plate 662. Since light beams D1, D2 are blue light, it can pass through light combining plate 662 with a high transmittance, also when the devices, the plates, and the mirror are arranged to make light beams D1, D2 incident on reflection region A62, which is a dichroic reflective coating. Light beams D1, D2 emitted from light emitting devices 601, 602 are blue light, and pass through light combining plate 662 with a high transmittance regardless of reflection region A62 and transmission region B62. Thus, the arrays of the solid-state light emitting elements of light emitting devices 601, 602 and the arrays of the solid-state light emitting elements of light emitting devices 603, 604 are not necessarily the same. The arrays of the solid-state light emitting elements of light emitting devices 601, 602, the arrays of the solid-state light emitting elements of light emitting devices 603, 604, and the arrays of the solid-state light emitting elements of light emitting devices 605, 606 are not necessarily the same.

6-2. Effects and the Like

With light source device 16 of the sixth exemplary embodiment, the combination of blue light beams D1, D2 in a closest packed array, the combination of red light beams D3, D4 in a closest packed array, and the combination of green light beams D5, D6 in a closest packed array can be combined for emitting white light. Thus, the combined luminous flux of a smaller size can be emitted from the light source device, and a smaller and high-brightness light source device can be provided.

The colors of the light beams emitted from the solid-state light emitting elements of the light emitting devices can be changed by selecting the reflection and transmission characteristics of the dichroic reflective coating forming reflection region A62 of light combining plate 662 and dichroic mirror 664 in accordance with the color of light beams emitted from the light emitting devices.

Light source device 16 according to the sixth exemplary embodiment emitting white light can be used instead of white light source device 100 of projection display apparatuses 120, 130 illustrated in FIG. 11 and FIG. 12.

Other Embodiments

As described above, some embodiments have been described as examples of the techniques of the present disclosure. However, the techniques of the present disclosure are not limited to these, and can be applied to embodiments in which changes, replacements, additions, omissions, and the like have been made. It is also possible to combine the components described in the above-described embodiments to form a new embodiment.

As described above, embodiments have been described as examples of the techniques in the present disclosure. To this end, the accompanying drawings and detailed description are provided.

Thus, in order to exemplify the above-described techniques, the components illustrated in the attached drawings and described in the detailed description include not only components essential for solving the problem but also components not essential for solving the problem. Therefore, the fact that such non-essential components are illustrated in the accompanying drawings or described in the detailed description should not immediately determine that these non-essential components are essential.

Further, since the above-described embodiments are for exemplifying the techniques in the present disclosure, various changes, replacements, additions, omissions, and the like can be made within the scope of the appended claims or the scope equivalent thereto.

The light source device according to the present disclosure can be applied to a projection display apparatus using a light modulation element.

What is claimed is:

1. A light source device comprising:
   a first light emitting device including a plurality of first solid-state light emitting elements arranged at a regular interval in a two dimensional array form;
   a second light emitting device including a plurality of second solid-state light emitting elements arranged at a regular interval in a two dimensional array form; and
   a first light combining plate including a first region and a second region, the first region transmitting first light beams emitted from the plurality of first solid-state light emitting elements of the first light emitting device, the second region reflecting second light beams emitted from the plurality of second solid-state light emitting elements of the second light emitting device,
   wherein the second region comprises one hexagonal reflection region for each of the second light beams incident on the second region.

2. The light source device according to claim 1, wherein beam arrangement of (i) the first light beams transmitted through the first light combining plate and (ii) the second light beams reflected by the first light combining plate form a closest packed array.

3. The light source device according to claim 2, further comprising:
   a third light emitting device including a plurality of third solid-state light emitting elements proximally arranged on a base at a regular interval in a two dimensional array form;
   a fourth light emitting device including a plurality of fourth solid-state light emitting elements proximally arranged on a base at a regular interval in a two dimensional array form;
   a polarized beam splitter that reflects third light beams emitted from the plurality of third solid-state light emitting elements of the third light emitting device;
   a second light combining plate including a third region and a fourth region, the third region transmitting the third light beams emitted from the plurality of third solid-state light emitting elements of the third light emitting device, the fourth region reflecting fourth light beams emitted from the plurality of fourth solid-state light emitting elements of the fourth light emitting device; and
   a waveplate that transmits the first light beams from the plurality of first solid-state light emitting elements that have transmitted through the first region of the first light combining plate and the second light beams from the second solid-state light emitting elements reflected by the second region of the first light combining plate, wherein the first light beams from the plurality of first solid-state light emitting elements and the plurality of second solid-state light emitting elements that have transmitted through the waveplate transmit through the polarized beam splitter and the second light combining plate, and beam arrangement of (i) the third light beams transmitted through the second light combining plate and (ii) the fourth light beams reflected by the second light combining plate form a closest packed array.

4. The light source device according to claim 3, wherein the second light combining plate includes a translucent substrate, the fourth region is provided on the translucent substrate and includes a polarized beam splitter reflective coating, and the waveplate is a half wavelength plate.

5. The light source device according to claim 1, wherein the first region is a transmission region formed by forming, on the first light combining plate, one hexagonal opening portion for each of the first light beams incident on the first region.

6. The light source device according to claim 1, wherein the first light combining plate includes a translucent substrate provided with anti-reflective coating, and the second region includes a reflective coating provided on the translucent substrate.

7. The light source device according to claim 1, wherein the plurality of first solid-state light emitting elements and the plurality of second solid-state light emitting elements are semiconductor lasers that emit light in a first wavelength range.

8. The light source device according to claim 7, wherein the first wavelength range is from 447 nm to 462 nm.

9. The light source device according to claim 1, further comprising:
  a third light emitting device including a third solid-state light emitting element; and
  a dichroic mirror that reflects light first beams emitted from the plurality of first solid-state light emitting elements of the first light emitting device, and transmits a third light beam emitted from the third solid-state light emitting element of the third light emitting device, wherein
  the first light beams from the plurality of first solid-state light emitting elements reflected by the dichroic mirror transmit through the first region of the first light combining plate, and
  the third light beam from the third solid-state light emitting element that has transmitted through the dichroic mirror transmits through the first light combining plate.

10. The light source device according to claim 9, wherein the plurality of first solid-state light emitting elements and the plurality of second solid-state light emitting elements emit light in a second wavelength range,
  the third solid-state light emitting element emits light in a third wavelength range,
  the first light combining plate includes a translucent substrate, and
  the second region includes a dichroic reflective coating that is provided on the translucent substrate, reflects the light in the second wavelength range, and transmits the light in the third wavelength range.

11. The light source device according to claim 10, wherein the second wavelength range is from 515 nm to 535 nm, and the third wavelength range is from 457 nm to 472 nm or from 630 nm to 650 nm.

12. The light source device according to claim 1, further comprising:
  a third light emitting device including a plurality of third solid-state light emitting elements proximally arranged on a base at a regular interval in a two dimensional array form;
  a fourth light emitting device including a plurality of fourth solid-state light emitting elements proximally arranged on a base at a regular interval in a two dimensional array form;
  a first dichroic mirror that transmits the first light beams emitted from the plurality of first solid-state light emitting elements of the first light emitting device and the second light beams emitted from the plurality of second solid-state light emitting elements of the second light emitting device, and reflects third light beams emitted from the plurality of third solid-state light emitting elements of the third light emitting device; and
  a second light combining plate including: a third region and a fourth region, the third region transmitting the third light beams emitted from the plurality of third solid-state light emitting elements of the third light emitting device, the fourth region reflecting fourth light beams emitted from the plurality of fourth solid-state light emitting elements of the fourth light emitting device,
  wherein the first light beams emitted and the second light beams which have transmitted through the first dichroic mirror, transmit through the second light combining plate.

13. The light source device according to claim 12, further comprising:
  a fifth light emitting device including a plurality of fifth solid-state light emitting elements proximally arranged on a base at a regular interval in a two dimensional array form;
  a sixth light emitting device including a plurality of sixth solid-state light emitting elements proximally arranged on a base at a regular interval in a two dimensional array form;
  a third light combining plate including a fifth region and a sixth region, the fifth region transmitting fifth light beams emitted from the plurality of fifth solid-state light emitting elements of the fifth light emitting device, the sixth region reflecting sixth light beams emitted from the plurality of sixth solid-state light emitting elements of the sixth light emitting device; and
  a second dichroic mirror that reflects the first light beams emitted from the plurality of first solid-state light emitting elements of the first light emitting device, the second light beams emitted from the plurality of second solid-state light emitting elements of the second light emitting device, the third light beams emitted from the plurality of third solid-state light emitting elements of the third light emitting device, and the fourth light beams emitted from the plurality of fourth solid-state light emitting elements of the fourth light emitting device, and transmits the fifth light beams emitted from the plurality of fifth solid-state light emitting elements of the fifth light emitting device and the sixth light beams emitted from the plurality of sixth solid-state light emitting elements of the sixth light emitting device.

14. The light source device according to claim 13, wherein
- the plurality of first solid-state light emitting elements and the plurality of second solid-state light emitting elements emit light in a second wavelength range,
- the plurality of third solid-state light emitting elements and the plurality of fourth solid-state light emitting elements emit light in the second wavelength range, and
- the plurality of fifth solid-state light emitting elements and the plurality of sixth solid-state light emitting elements emit light in a third wavelength range.

15. A projection display apparatus comprising:
- an illumination device including the light source device according to claim 1;
- an image generation unit that generates image light by modulating light from the illumination device using an image signal; and
- an optical system that projects the image light.

* * * * *